(12) United States Patent
Kazawa et al.

(10) Patent No.: US 8,477,800 B2
(45) Date of Patent: *Jul. 2, 2013

(54) PASSIVE OPTICAL NETWORK SYSTEM AND OPERATION METHOD THEREOF

(75) Inventors: Tohru Kazawa, Kokubunji (JP); Norihiro Sakamoto, Chigasaki (JP); Masaki Ohira, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 498 days.

This patent is subject to a terminal disclaimer.

(21) Appl. No.: 12/777,470

(22) Filed: May 11, 2010

(65) Prior Publication Data
US 2010/0290783 A1 Nov. 18, 2010

(30) Foreign Application Priority Data
May 13, 2009 (JP) ................................. 2009-116069

(51) Int. Cl.
*H04B 7/216* (2006.01)
*H04B 7/212* (2006.01)

(52) U.S. Cl.
USPC ......................................... 370/441; 370/442

(58) Field of Classification Search
USPC ................ 370/441, 442; 398/168, 52, 53, 75, 398/98, 99, 100, 102
See application file for complete search history.

(56) References Cited

U.S. PATENT DOCUMENTS

| | | | |
|---|---|---|---|
| 8,139,950 B2 * | 3/2012 | Niibe et al. ................... | 398/168 |
| 2003/0035173 A1 * | 2/2003 | Byers et al. ................... | 359/135 |
| 2007/0064731 A1 * | 3/2007 | Mizutani et al. ............. | 370/468 |
| 2008/0181613 A1 * | 7/2008 | Bouda ............................ | 398/98 |
| 2009/0010650 A1 | 1/2009 | Tsuchiya et al. | |
| 2009/0202242 A1 * | 8/2009 | Niibe et al. .................. | 398/63 |
| 2012/0008948 A1 * | 1/2012 | Kazawa et al. ............... | 398/58 |

FOREIGN PATENT DOCUMENTS

| | | |
|---|---|---|
| CN | 101340734 A | 1/2009 |
| JP | 2000-188593 A | 7/2000 |
| JP | 2002-344509 A | 11/2002 |
| JP | 2008-054006 A | 3/2008 |
| WO | 2007141100 A1 | 12/2007 |

OTHER PUBLICATIONS

ITU-T Recommendation G984.3 (Mar. 2008) Gigabit-capable Passive Optical Networks (G-PON): Transmission convergence layer specification; pp. 1-136.

* cited by examiner

*Primary Examiner* — Chuong T Ho
(74) *Attorney, Agent, or Firm* — Mattingly & Malur, PC

(57) ABSTRACT

A master station includes an optical transmission interface for transmitting signals to a plurality of slave stations at a first transfer rate or a second transfer rate which is higher than the first one, packet buffers for accumulating the signals addressed to each of the plurality of slave stations, and a control unit for determining transmission timings and transfer rates of the signals on the basis of an amount of the signals accumulated in the packet buffers, transmitting the signals with the determined timings and rates, and notifying each of the slave stations about the determined timings and rates. Each of the slave stations includes an optical reception interface for receiving the signals of the first transfer rate or the second transfer rate, and a control unit for controlling the optical reception interface on the basis of the timings and rates which the slave stations is notified.

9 Claims, 20 Drawing Sheets

X: TOTAL OF ASSIGNED BYTE LENGTHS
Y: PAYLOAD BYTES AT 2.4 Gbit/s

| ONU-ID (901) | BYTE LENGTH (902) |
|---|---|
| 2 | 40000 |
| 4 | 80000 |
| 5 | 120000 |
| 1 | 160000 |
| 3 | 200000 |

ASSIGNED-BYTES' TOTAL = 600000

| ONU-ID (901) | Start (1002) | End (1003) | TRANSFER RATE (1004) |
|---|---|---|---|
| 2 | 0 | 19999 | 2.4G |
| 4 | 19999 | 59999 | 2.4G |
| 5 | 60000 | 107005 | 2.4G |
| 1 | 107006 | 127005 | 10G |
| 3 | 127006 | 152005 | 10G |

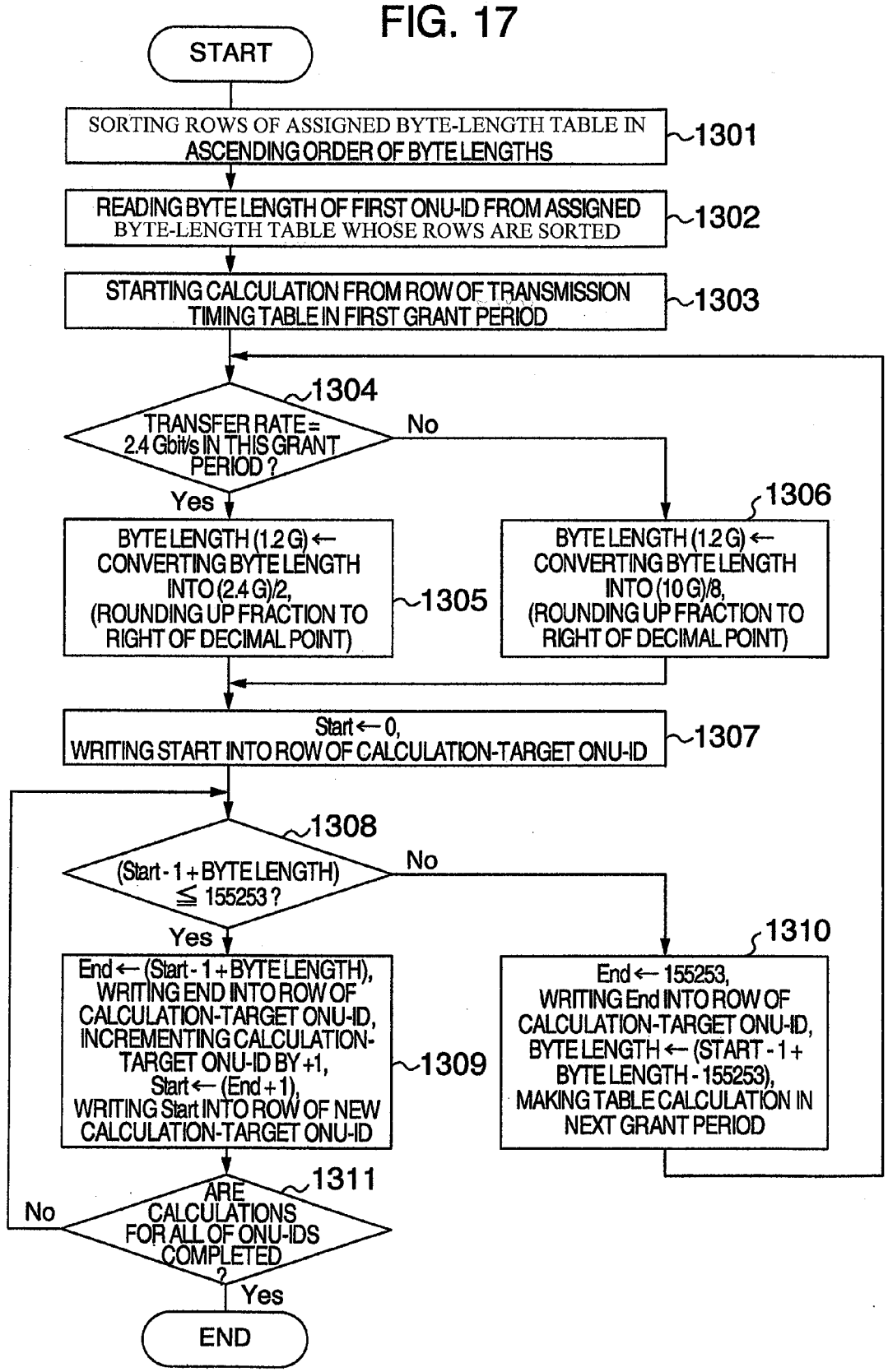

| ONU-ID (901) | BYTE LENGTH (902) |
| --- | --- |
| 2 | 10000 |
| 1 | 20000 |
| 3 | 100000 |
| 5 | 200000 |
| 4 | 400000 |

ASSIGNED-BYTES' TOTAL = 730000

FIG. 18B

| ONU-ID | BYTE LENGTH |
| --- | --- |
| 2 | 20000 |
| 1 | 40000 |
| 3 | 200000 |
| 5 | 400000 |
| 4 | 800000 |

ASSIGNED-BYTES' TOTAL = 1460000

FIG. 18C

| ONU-ID | BYTE LENGTH |
| --- | --- |
| 2 | 40000 |
| 1 | 80000 |
| 3 | 400000 |
| 5 | 800000 |
| 4 | 1600000 |

ASSIGNED-BYTES' TOTAL = 2920000

FIG. 18D

| ONU-ID | BYTE LENGTH |
| --- | --- |
| 2 | 50000 |
| 1 | 100000 |
| 3 | 500000 |
| 5 | 1000000 |
| 4 | 2000000 |

ASSIGNED-BYTES' TOTAL = 3560000

FIG. 18E

| ONU-ID | BYTE LENGTH |
| --- | --- |
| 2 | 60000 |
| 1 | 120000 |
| 3 | 600000 |
| 5 | 1200000 |
| 4 | 2400000 |

ASSIGNED-BYTES' TOTAL = 4380000

FIG. 19A  734'

| ONU-ID (901) | Start (1002) | End (1003) | TRANSFER RATE (1004) |
|---|---|---|---|
| 2 | 0 | 4999 | 2.4G |
| 1 | 5000 | 15499 | 2.4G |
| 3 | 15500 | 65499 | 2.4G |
| 5 | 65500 | 155253 | 2.4G |
| 5 | 0 | 10246 | 2.4G |
| 4 | 10247 | 155245 | 2.4G |
| 4 | 0 | 54992 | 2.4G |
|  | 0 | 0 | — |

- Rows 1–4: FIRST FRAME PERIOD
- Rows 5–6: SECOND FRAME PERIOD
- Row 7: THIRD FRAME PERIOD
- Row 8: FOURTH FRAME PERIOD

FIG. 19B

| ONU-ID | Start | End | TRANSFER RATE |
|---|---|---|---|
| 2 | 0 | 9999 | 2.4G |
| 1 | 10000 | 29999 | 2.4G |
| 3 | 30000 | 129999 | 2.4G |
| 5 | 130000 | 155253 | 2.4G |
| 5 | 0 | 155253 | 2.4G |
| 5 | 0 | 19491 | 2.4G |
| 4 | 19492 | 155253 | 2.4G |
| 4 | 0 | 66559 | 10G |

- Rows 1–4: FIRST FRAME PERIOD
- Row 5: SECOND FRAME PERIOD
- Rows 6–7: THIRD FRAME PERIOD
- Row 8: FOURTH FRAME PERIOD

FIG. 19C

| | ONU-ID | Start | End | TRANSFER RATE |
|---|---|---|---|---|
| FIRST FRAME PERIOD | 2 | 0 | 19999 | 2.4G |
| | 1 | 20000 | 59999 | 2.4G |
| | 3 | 60000 | 155253 | 2.4G |
| SECOND FRAME PERIOD | 3 | 0 | 104745 | 2.4G |
| | 5 | 104746 | 155253 | 2.4G |
| THIRD FRAME PERIOD | 5 | 0 | 87374 | 10G |
| | 4 | 87375 | 155253 | 10G |
| FOURTH FRAME PERIOD | 4 | 0 | 132120 | 10G |

FIG. 19D

| | ONU-ID | Start | End | TRANSFER RATE |
|---|---|---|---|---|
| FIRST FRAME PERIOD | 2 | 0 | 24999 | 2.4G |
| | 1 | 25000 | 74999 | 2.4G |
| | 3 | 75000 | 155253 | 2.4G |
| SECOND FRAME PERIOD | 3 | 0 | 42436 | 10G |
| | 5 | 42437 | 155253 | 10G |
| THIRD FRAME PERIOD | 5 | 0 | 96795 | 10G |
| | 4 | 96796 | 155253 | 10G |
| FOURTH FRAME PERIOD | 4 | 0 | 110378 | 10G |

FIG. 19E

| | ONU-ID | Start | End | TRANSFER RATE |
|---|---|---|---|---|
| FIRST FRAME PERIOD | 2 | 0 | 7499 | 10G |
| | 1 | 7500 | 22499 | 10G |
| | 3 | 22500 | 97499 | 10G |
| | 5 | 97500 | 155253 | 10G |
| SECOND FRAME PERIOD | 5 | 0 | 92246 | 10G |
| | 4 | 92247 | 155253 | 10G |
| THIRD FRAME PERIOD | 4 | 0 | 155253 | 10G |
| FOURTH FRAME PERIOD | 4 | 0 | 81739 | 10G |

PASSIVE OPTICAL NETWORK SYSTEM AND OPERATION METHOD THEREOF

INCORPORATION BY REFERENCE

The present application claims priority from Japanese application JP2009-116069 filed on May 13, 2009, the content of which is hereby incorporated by reference into this application.

BACKGROUND OF THE INVENTION

The present invention relates to a passive optical network system, an optical line terminal, and optical network units. More particularly, it relates to a passive optical network system in which a plurality of subscriber connection devices share an optical transmission line.

In access communications networks whose subscribers are connected to each other, significant progress has been also made toward the high-rate/broad-band implementation of the communications networks. In accompaniment with this trend, there have been projects for the introduction of a Passive Optical Network system (which, hereinafter, will be referred to as "PON"). The PON is defined in such recommendations as the recommendation G984.3 made by the International Telecommunication Union Telecommunication Standardization Sector (which, hereinafter, will be referred to as "ITU-T"). The PON is a system in which an Optical Line Terminal (which, hereinafter, will be referred to as "OLT") and Optical Network Units (which, hereinafter, will be referred to as "ONUs") are connected to each other via a passive optical network including a main optical fiber, an optical splitter, and a plurality of branch-line optical fibers. Here, the OLT corresponds to a master station connected to a higher-order communications network, and the ONUs correspond to slave stations containing terminals (i.e., PCs or telephones) of a plurality of subscribers. Concretely, the mode of communications performed in the PON is as follows: First, signals from the terminals (i.e., PCs) connected to the respective ONUs are converted into optical signals. Next, these optical signals are optically (time-division) multiplexed by the optical splitter from the branch-line optical fibers into the main optical fiber, then being transmitted to the OLT. Moreover, the OLT applies a communications processing to these (time-division) multiplexed signals from the respective ONUs. Finally, the OLT transmits the communications-processed signals to the higher-order communications network, or to another ONU connected to the OLT.

The introduction of the PON had started with the system which addresses 64-Kbit/s low-rate signals. Moreover, the introduction of the following PONs is underway at present: B-PON (: Broadband PON) which transmits/receives fixed-length ATM cells at about 600 Mbit/s, E-PON (: Ethernet PON) which transmits/receives variable-length packets of Ethernet (: registered trademark, indication of the registered trademark will be omitted hereinafter) at about 1 Gbit/s at the maximum, and G-PON (: Gigabit-capable PON) which addresses about 2.4-Gbit/s higher-rate signals. Furthermore, in the near future, there will be a request for the implementation of high-rate PONs which are capable of addressing 10-Gbit/s to 40-Gbit/s signals. In addition, as the method for implementing these high-rate PONs, consideration is nowadays given to the utilization of TDM (: Time-Division Multiplexing) for time-division multiplexing a plurality of signals in much the same way as in the already-existing PONs. Incidentally, the configuration of the already-existing PONs is as follows: Different wavelengths are employed and used between an upstream (i.e., from each ONU to the OLT) signal and a downstream (i.e., from the OLT to each ONU) signal, and a communication time is assigned to each ONU in the communications between the OLT and each ONU. Concretely, this configuration is that burst-like variable-length signals (i.e., burst signals) are assigned which can make it easier to address various types of signals (such as voice, picture, and data).

In each of the above-described PONs, the ONUs are set up in subscribers' homes which are positioned at various places. Accordingly, the distances ranging from the OLT to the respective ONUs are different from each other. Namely, there occurs a variation in the lengths (i.e., transfer distances) of the optical fibers constituted by the main optical fiber and the branch-line optical fibers from the OLT to the respective ONUs. Consequently, there occurs a variation in the transfer delays (delay amounts) between the OLT and the respective ONUs. As a result, there exists a possibility that, even if the respective ONUs transmit the optical signals with different timings set thereto, the optical signals from the respective ONUs will collide/interfere with each other on the main optical fiber. In view of this situation, in each PON, after the distance measurements are carried out between the OLT and the respective ONUs, the delays of the signal outputs from the respective ONUs are adjusted so that the signal outputs from the respective ONUs will not collide with each other. This adjustment is made using, e.g., the ranging technology defined by the ITU-T recommendation G984.3. Also, based on transmission requests from the respective ONUs, the OLT determines the bandwidths of signals for granting transmission permissions to the respective ONUs. This determination is made using dynamic bandwidth assignment (which, hereinafter, will be referred to as "DBA") technology. Then, the OLT specifies the signal transmission timings to the respective ONUs so that the optical signals from the respective ONUs will not collide/interfere with each other on the main optical fiber. This specification is performed such that the delay amounts measured with the ranging are also taken into consideration. Namely, each PON is configured so that the operation of the communications therein will be performed in a state where the timings of the signals to be transmitted/received between the OLT and the respective ONUs are managed inside the system.

In the above-described G-PON, each of the signals transmitted from the respective ONUs to the OLT is configured as follows: Namely, interference-preventing guard time formed of 12 bytes at the maximum, preamble utilized for determination of signal-identifying threshold value for an in-OLT receiver and clock extraction, burst overhead byte referred to as "delimiter" for identifying separation of a received signal, and a control signal for the G-PON (which is also referred to as "overhead or header" in some cases) are added to the front end of the data (which is also referred to as "payload" in some cases). This configuration is implemented so that the signals from the respective ONUs which are (time-division) multiplexed onto the main optical fiber can be processed in a manner of being identified with each other by the OLT. Incidentally, each data is variable-length burst data, and a header which is referred to as "GEM (: G-PON Encapsulation Method) header" for processing the variable-length data is added to the front end of each data.

Meanwhile, each of the signals transmitted from the OLT to the respective ONUs is configured as follows: Namely, frame synchronization pattern for identifying the front end, PLOAM area for transmitting monitor/maintenance/control information, and overhead which is referred to as "grant instruction area" (also referred to as "header" in some cases)

for instructing the signal transmission timings for the respective ONUs are added to the front end of each of the data which are (time-division) multiplexed in a manner of being addressed to the respective ONUs. This configuration is implemented so that the signals transmitted from the OLT can be processed in a manner of being identified with each other by the respective ONUs. Incidentally, similarly to each of the signals from the respective ONUs, the GEM header for processing the variable-length data is added to the front end of each of the multiplexed data addressed to the respective ONUs. Using the grant instruction area, the OLT specifies the upstream transmission permission timings (i.e., transmission Start and End) for the respective ONUs. This specification is performed with respect to the respective ONUs in a byte unit. These transmission permission timings are referred to as "grants". Furthermore, when the respective ONUs transmit the plural pieces of OLT-addressed data in accordance with the transmission permission timings, these plural pieces of data are optically (time-division) multiplexed onto the main optical fiber, then being received by the OLT.

SUMMARY OF THE INVENTION

As is typically seen in the transition from the B-PON to the G-PON, the development/introduction of the PONs is now progressing toward the direction of the development/introduction of a PON which is capable of addressing even higher-rate signals. Here, it has been known that, the higher the transfer rate of a signal in a PON becomes, the larger amount of power each optical module and LSI for implementing the signal transfer function of the PON comes to consume. For example, in order to accomplish the higher transfer rate, each optical module ensures the necessary bandwidth by causing a larger amount of current to flow as the transfer rate becomes higher. Also, a digital-signal processing LSI fabricated using CMOS technology consumes a power which is substantially proportional to the square of the rate of operation clocks. Namely, from now on as well, there will remain the tendency that, the higher the transfer rate becomes, the larger amount of power the PON comes to consume.

Meanwhile, there is a tendency for subscribers of the PONs to seek for a higher-rate PON. The subscribers, however, do not wish the higher transfer rate at all times. They do not request the higher transfer rate during a time-zone during which no communications is performed, of course. Even when the communications are underway, in the data transfer in an Internet access, they do not necessitate the higher transfer rate during the browsing of contents or the execution of some operation (although they surely request the higher transfer rate during a time-period during which a large amount of image data or a large-capacity file is being downloaded or uploaded). Also, in the TCP protocol used for the data transfer, an acknowledge signal packet needs to be returned when constant pieces of packets are received. As a result, the data-transmitting side does not transmit the subsequent data until it has received the acknowledge signal packet. Namely, the actual circumstances of the operations in the PONs are that, even when the data transfer is underway, the data traffic comes to exhibit an exceedingly-high-burst-property transfer mode in many cases. Nevertheless, each optical module and LSI, which constitutes the actual PONs, operates and consumes the power even during the time-zone during which no data is substantially transferred. This fact has become a cause for the occurrence of a tremendous amount of waste of power. On account of this situation, it turns out that a PON system is requested which allows the data transfer to be performed at a lower transfer rate if the end-user traffic is smaller; whereas at a higher transfer rate if the end-user traffic is larger.

In the upstream direction of the PON, the configuration is that the signals outputted from the respective slave stations in the burst-like manner are time-division multiplexed. This configuration allows the power consumption to be reduced by causing the transfer rates of the signals transmitted from the respective slave stations to vary in correspondence with the traffics. On the other hand, in the downstream direction of the PON, the configuration is that the frame formed by time-division multiplexing the signals addressed to the respective slave stations is multicasted to all of the slave stations continuously. This configuration eventually causes a certain slave station to receive a signal which is not addressed to the slave station of its own. Namely, even when the signal which is addressed to another slave station has reached the slave station, the components such as the optical modules continuously operate and consume the power. Accordingly, it turns out that, if a reduction in the power consumption during this time-zone is made implementable, the low power-consumption implementation of the PON will be promoted even further. In view of the above-described points, in a PON whose configuration is that the signals having different transfer rates can be operated in a manner of being made mixed to each other by the time-division multiplexing, an object of the present invention is to implement a PON which permits the waste of the power consumption to be reduced down to the smallest possible degree by switching the data transfer on the basis of the end-user traffics in the downstream direction in particular.

In order to accomplish the above-described object, the passive optical network system of the present invention is a passive optical network system wherein a master station performs a multicast transmission of a frame signal to a plurality of slave stations, the frame signal being formed by time-division multiplexing signals which are addressed to the plurality of slave stations and received from a higher-order network, each of the plurality of slave stations receiving the frame signal and processing, from the received frame signal, the signal which is addressed to the slave station of its own, the master station including an optical transmission interface for transmitting the signals to the plurality of slave stations at a first transfer rate or a second transfer rate which is higher than the first transfer rate, a packet buffer for accumulating the signals in correspondence with each of the plurality of slave stations which are destination addresses of the signals, the signals being received from the higher-order network, and a control unit for determining transmission timings and transfer rates of the signals on the basis of an amount of the signals accumulated in the packet buffer, the signals being to be transmitted to each of the plurality of slave stations, transmitting the signals to each of the plurality of slave stations from the optical transmission interface on the basis of the transmission timings and transfer rates determined, and notifying each of the plurality of slave stations about the determined transmission timings and transfer rates, each of the plurality of slave stations including an optical reception interface for receiving the signals of the first transfer rate or the second transfer rate, and a control unit for controlling the optical reception interface on the basis of the transmission timings and transfer rates about which each of the plurality of slave stations is notified from the master station.

Moreover, the control unit of the master station determines amounts of the signals on the basis of the amount of the signals accumulated in the packet buffer, the signals being to be transmitted to each of the plurality of slave stations, and after that, determines the transfer rate of the signal to an arbitrary slave station of the plurality of slave stations as being the first transfer rate if the determined amounts of the signals are found to be lower than a maximum transfer amount which is transferable at the first transfer rate, and determines the transfer rate of the signal to the arbitrary slave station of the plurality of slave stations as being the second transfer rate if the determined amounts of the signals are found to be higher than the maximum transfer amount which is transferable at the first transfer rate.

According to the present invention, in a PON whose configuration is that a plurality of signals having different downstream transfer rates can be operated in a manner of being made mixed to each other by the time-division multiplexing, it becomes possible to implement a passive optical network system which permits the waste of the power consumption to be reduced down to the smallest possible degree on the basis of the end-user traffics.

Other objects, features and advantages of the invention will become apparent from the following description of the embodiments of the invention taken in conjunction with the accompanying drawings.

BRIEF DESCRIPTION OF THE DRAWINGS

FIGS. 11A and 11B are memory configuration diagrams for illustrating configuration examples of respective tables installed in the OLT;

FIG. 17 is an operation flow diagram for illustrating still another operation example of the OLT control unit;

FIGS. 18A to 18E are memory configuration diagrams for illustrating another configuration example of the assignment byte-length table; and FIGS. 19A to 19E are memory configuration diagrams for illustrating another configuration example of the transmission timing table.

DETAILED DESCRIPTION OF THE INVENTION

Figure 1:
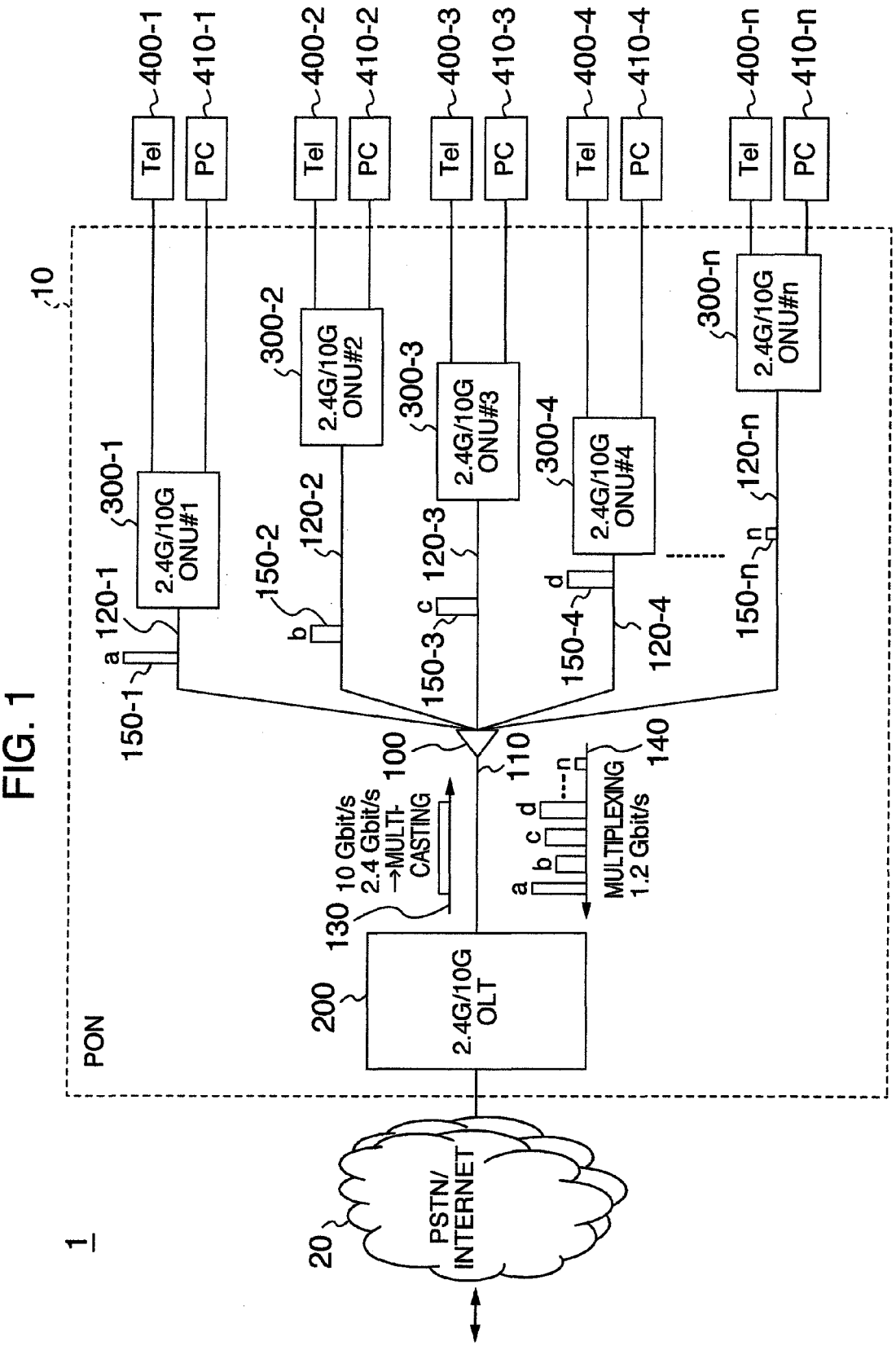
FIG. 1 is a network configuration diagram for illustrating a configuration example of the optical access network using the PON.

Hereinafter, referring to the drawings, a detailed explanation will be given below concerning the configuration and operation of a PON according to the present embodiments. At this time, the detailed explanation will be given selecting, as its example, the configuration and operation of a PON where G-PON and 10 G-PON are mixed. Here, the G-PON is defined by the ITU-T recommendation G984.3, and the 10 G-PON is a next-generation PON which is expected to be introduced in the near future, and whose transfer rate is raised.

In the following explanation, a PON is assumed whose configuration is that variable-length data is processed using the TDM scheme in much the same way as in the G-PON. Moreover, in this example, the transfer rate of downstream data from the OLT to each ONU is of the mixed configuration of 10 Gbit/s (which is equal to 9.95328 Gbit/s accurately, but, hereinafter, will be referred to as "10 Gbit/s") and 2.4 Gbit/s (which is equal to 2.48832 Gbit/s accurately, but, hereinafter, will be referred to as "2.4 Gbit/s" similarly). Also, the transfer rate of upstream data from each ONU to the OLT is of one type of 1.2 Gbit/s (which is equal to 1.24416 Gbit/s accurately, but, hereinafter, will be referred to as "1.2 Gbit/s" similarly). Incidentally, the numerical values of these transfer rates are just one example, and thus may also be some other transfer rates. Namely, the present embodiment is not limited to these numerical values. Also, the downstream transfer rates may be three or more, and a configuration is allowable that plural types of upstream transfer rates are mixed.

FIG. 1 is a network configuration diagram for illustrating a configuration example of the optical access network using the PON of the present invention.

The access network 1 is a network where communications are performed in such a manner that the Public Switched Telephone Network (: PSTN/Internet 20 (which, hereinafter, will be referred to as "higher-order network 20" in some cases)) and terminals (such as Tel (telephone): 400 (400-1 to 400-n), PC: 410 (410-1 to 410-n)) of subscribers are connected to each other via the PON 10. The PON 10 includes an OLT 200 (which, hereinafter, will be referred to as "master station" in some cases) connected to the higher-order network 20, and a plurality of ONUs 300 (300-1 to 300-n) (which, hereinafter, will be referred to as "slave stations" in some cases) containing the terminals (such as Tel: 400, PC: 410) of the subscribers. The communications between the higher-order network 20 and the subscriber terminals 400 and 410, or the communications between the subscriber terminals 400 and 410 themselves are performed in such a manner that the OLT 200 and the respective ONUs 300 are connected to each other via the passive optical network system including a main optical fiber 110, an optical splitter 100, and a plurality of branch-line optical fibers 120 (120-1 to 120-n). Each ONU 300 is an ONU 300 which is available in, e.g., both of the 10 G-PON and the G-PON (that is, e.g., the ONU capable of transmitting both of the 10-Gbit/s signal and the 2.4-Gbit/s signal in the downstream direction, and hereinafter, will be referred to as "2.4 G/10 G ONU" in some cases). In FIG. 1, the 5 units of ONUs 300 are connected to the OLT 200. Incidentally, according to the ITU-T recommendation G984.3, the number of the ONUs 300 connectable to the OLT 200 is 254 at the maximum.

A downstream signal 130 from the OLT 200 to the respective ONUs 300 is transmitted such that a frame which is formed by time-division multiplexing signals addressed to the respective ONUs 300 is multicast to the respective ONUs 300. Moreover, each ONU 300 receives the signal after judging whether or not the frame which has reached it has the transfer rate of its own, or the frame is the signal addressed to the station of its own. Based on the destination address of the signal, each ONU 300 transmits the received signal to the telephone 400 or the PC 410. Also, an upstream signal 140 from the respective ONUs 300 to the OLT 200 becomes an optically (time-division) multiplexed signal 140, then being transferred to the OLT 200. Here, the optically multiplexed signal 140 is formed via the optical splitter 100 by optically time-division multiplexing an upstream signal 150-1 transferred from the ONU 300-1, an upstream signal 150-2 transferred from the ONU 300-2, an upstream signal 150-3 transferred from the ONU 300-3, an upstream signal 150-4 transferred from the ONU 300-4, . . . , and an upstream signal 150-n transferred from the ONU 300-n. Also, the fiber lengths between the respective ONUs 300 and the OLT 200 are different from each other. As a result, the optically multiplexed signal 140 comes to take a form in which the signals 150 (150-1 to 150-n) having different amplitudes are multiplexed. Incidentally, the optical signal used as the downstream signal 130 is an optical signal whose wavelength bandwidth is equal to, e.g., 1.5 µm. Also, the optical signal used as the upstream signals 140 and 150 is an optical signal whose wavelength bandwidth is equal to, e.g., 1.3 µm. Both of these optical signals are transmitted/received in a manner of being wavelength-division multiplexed (WDM) on the same optical fibers 110 and 120.

Figure 2:
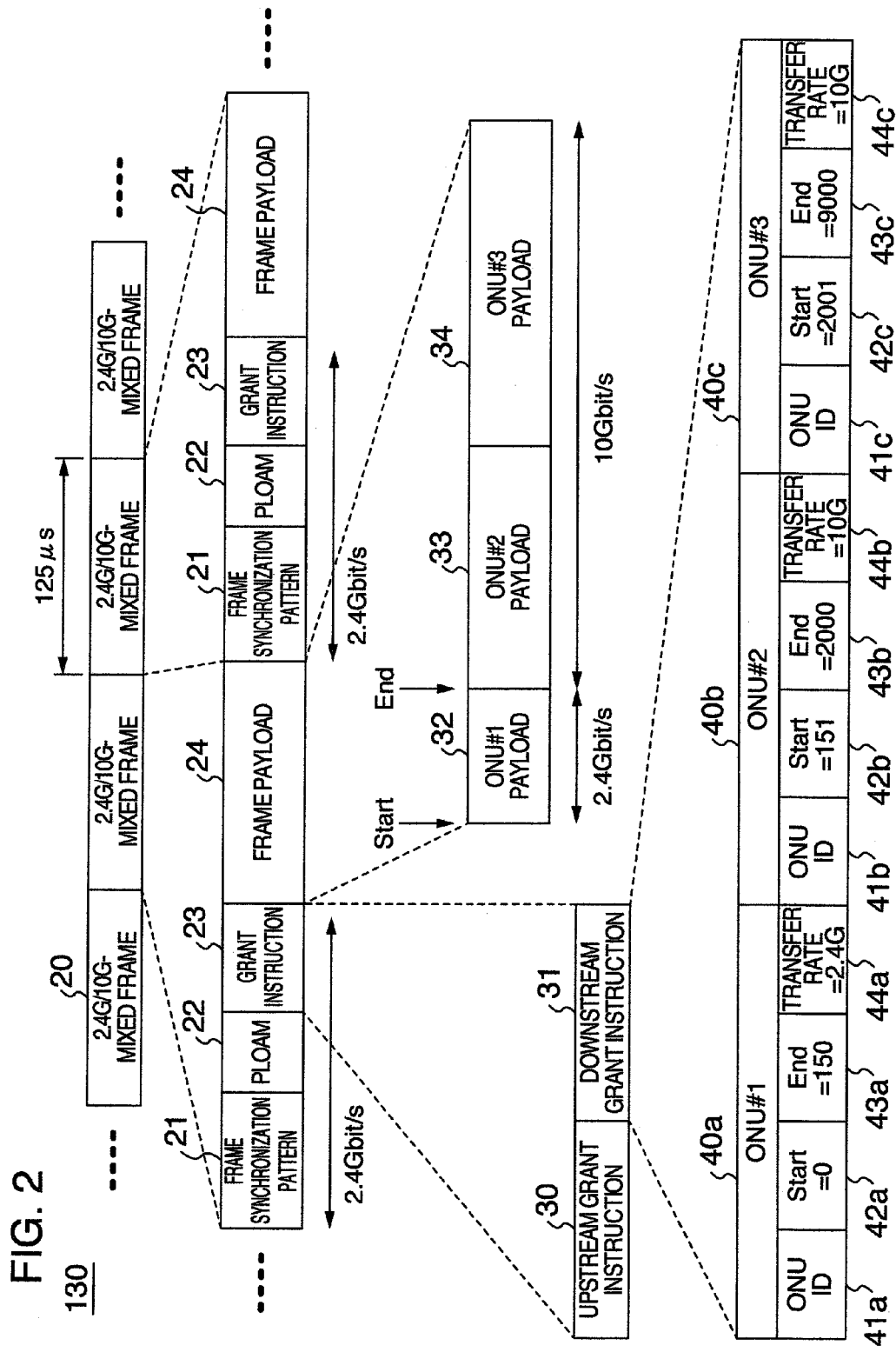
FIG. 2 is a frame configuration diagram for illustrating a configuration example of a downstream signal from an OLT to ONUs.

FIG. 2 is a frame configuration diagram for illustrating a configuration example of the downstream signal 130 from the OLT 200 to the respective ONUs 300.

The downstream signal 130 (which, hereinafter, will be referred to as "downstream frame", or as "frame" simply in some cases) has the 125-µs period configuration defined by the ITU-T recommendation G 984.3. The downstream signal 130 repeatedly transfers a 2.4 G/10 G-mixed frame 20 which is capable of containing the 2.4-Gbit/s signal and the 10-Gbit/s signal intermixed with an arbitrary ratio set there between. Each frame 20 includes areas of frame synchronization pattern 21, PLOAM (: Physical Layer Operation, Administration and Maintenance) 22, grant instruction 23, and frame payload 24. The frame synchronization pattern 21 is a fixed pattern for each ONU 300 to identify the front end of the 125-µs period frame. The PLOAM 22 stores therein information which the OLT 200 uses for the management of the physical layer of each ONU 300. Although a detailed explanation will be given later, the grant instruction 23 instructs the signal transmission timing and transfer rate for each ONU 300. In the present frame, the areas up to the frame synchronization pattern 21, the PLOAM 22, and the grant instruction 23 are transferred at the 2.4-Gbit/s transfer rate. Meanwhile, the frame payload 24 stores therein a user signal which travels from the OLT 200 to each ONU 300. The frame payload 24 contains the 2.4-Gbit/s signal and the 10-Gbit/s signal mixed in a manner compatible with each ONU 300.

The grant instruction 23 further includes areas of upstream grant instruction 30 and downstream grant instruction 31. The upstream grant instruction 30 instructs an upstream signal transmission timing (i.e., grant) for each ONU 300. In more detail, the instruction 30 instructs the grant for each TCONT, which is the user-signal control unit inside each ONU 300. Meanwhile, the downstream grant instruction 31 is an instruction which is introduced in the present invention independently of the definition given by the ITU-T recommendation G 984.3. Concerning the data which is stored into the frame payload 24 and is transmitted from the OLT 200 to each ONU 300, the instruction 31 notifies its transmission start time and transmission end time and transfer rate for each destination-address ONU number.

FIG. 2 illustrates the configuration example of the frame 20 corresponding to the network configuration illustrated in FIG. 1. Namely, FIG. 2 illustrates an ONU-ID#1-dedicated signal 40a for controlling the ONU 300-1, an ONU-ID#2-dedicated signal 40b for controlling the ONU 300-2, and an ONU-ID#3-dedicated signal 40c for controlling the ONU 300-3. Each ONU-dedicated signal 40 (40a to 40c) includes ONU-ID 41 (41a to 41c) for identifying each ONU, Start 42 (42a to 42c) for indicating the signal transmission start timing, End 43 (43a to 43c) for indicating the signal transmission end timing, and transfer-rate specification area 44 (44a to 44c). The transfer-rate specification area 44 instructs which of the 2.4-Gbit/s signal and the 10-Gbit/s signal should be used as the downstream signal 130. The Start 42 and End 43 indicate the transmission start timings and the transmission end timings for the signals of the above-described two transfer rates. Here, the time unit for the signals is defined and specified using the number of bytes in the 1.2-Gbit/s transfer rate which is the slowest transfer rate of all the upstream and downstream transfer rates. As a result, the frame configuration turns out to be a configuration that the time unit of the 2.4-Gbit/s signal is specified in a 2-byte unit, and that the time unit of the 10-Gbit/s signal is specified in an 8-byte unit. The reason for the definition like this is that the employment of a single notation makes it possible to operate and manage signals of a plurality of different transfer rates. The OLT 200 periodically transmits the grant instruction 23 to each ONU 300, thereby instructing what amount of downstream data will be transferred to each ONU 300. The Start 42 and End 43 are the information for indicating with which timings the data reception should be started and ended within each period during which the OLT 200 transmits the grant instruction 23. Within this time-interval specified by the OLT 200, each ONU 300 receives the downstream signal 130 at the transfer rate specified in the transfer-rate specification area 44. Incidentally, instead of using the End 43, the following instruction is also allowable: Data length of the data to be transmitted is specified. Then, from the timing specified in the Start 42, the data is transmitted by the amount of the specified data length.

The combined set of the above-described Start 42, End 43, and transfer-rate specification area 44 allows the notification of the start position, end position, and transfer rate of an ONU#1-addressed signal payload 32 which is stored into the frame payload 24. At the inside of each ONU 300 whose explanation will be given later, the use of the above-described downstream grant instruction 31 allows the detection of the time-interval and transfer rate of the signal that the station of its own should receive. Moreover, each ONU 300 controls an optical reception interface inside, thereby receiving the signal of the specified transfer rate. These circumstances are basically the same with respect to the subsequent ONU#2-addressed signal payload 33 and ONU#3-addressed signal payload 34 as well. FIG. 2 illustrates a case where the ONU#1-addressed signal payload 32 is the 2.4-Gbit/s payload, and the ONU#2-addressed signal payload 33 and ONU#3-addressed signal payload 34 are the 10-Gbit/s payloads.

In the above-described explanation, assuming that the transfer rate is equal to 2.4 Gbit/s, the total number of the bytes which are transferable within the 125-μs frame period is equal to 311040 bytes. Then, 4 bytes and 16 bytes are assigned to the frame synchronization pattern 21 and the PLOAM 22, respectively. Moreover, assuming that the number of the ONUs 300 is 32, the value resulting from 16 bytes×32 (=512 bytes) is assigned to the grant instruction 23. Accordingly, the total bytes assigned to these three areas become equal to 532 bytes. As a result, assuming that the transfer rate is equal to 2.4 Gbit/s, the transfer capacity that the frame payload 24 can possess becomes equal to 310508 bytes (=311040 bytes−532 bytes). Also, when only the 10-Gbit/s signals are contained into the frame payload 24, the signals of 1242032 bytes (=310508 bytes×4) can be contained therein.

Figure 3:
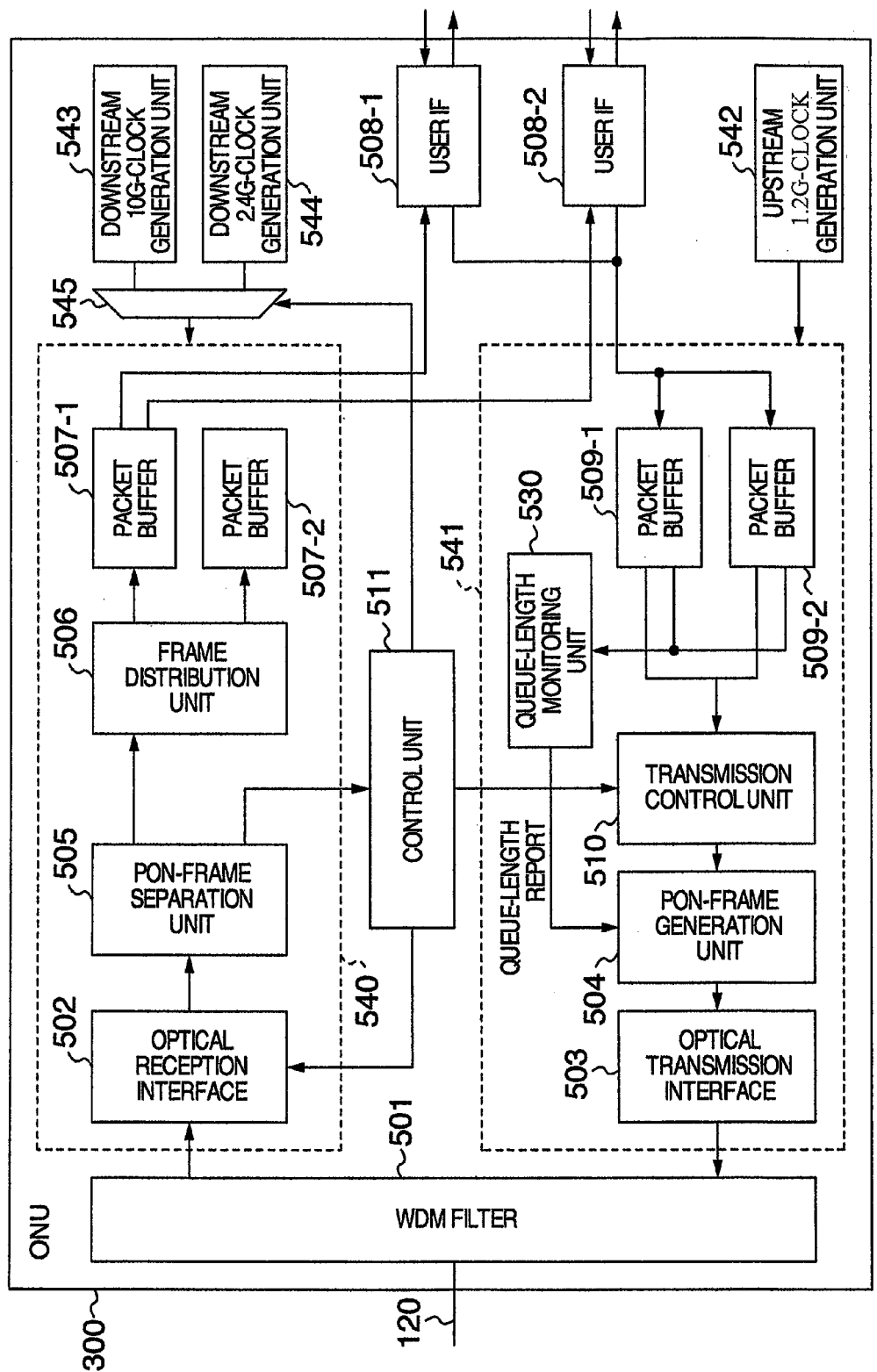
FIG. 3 is a block configuration diagram for illustrating a configuration example of the ONU.

FIG. 3 is a block configuration diagram for illustrating a configuration example of each ONU 300 used in the PON of the present invention.

Each ONU 300 includes a WDM filter 501, a reception unit 540, a transmission unit 541, a control unit 511, and UNIs (User-Network Interface) 508-1 and 508-2. The reception unit 540 includes an optical reception interface 502, a PON-frame separation unit 505, a frame distribution unit 506, and packet buffers 507-1 and 507-2. Also, the transmission unit 541 includes packet buffers 509-1 and 509-2, a transmission control unit 510, a PON-frame generation unit 504, an optical transmission interface 503, and a queue-length monitoring unit 530. The operation clock for the transmission unit 541 is supplied from an upstream 1.2 G-clock generation unit 542. The operation clock for the reception unit 540 is supplied such that an output from either a downstream 10 G-clock generation unit 543 or a downstream 2.4 G-clock generation unit 544 is selected by a selector 545. This selector control is determined in accordance with the transfer-rate specification (i.e., 44 in FIG. 2) which is transmitted from the OLT 200 and is read by the control unit 511.

The optical signal received from the branch-line optical fiber 120 is wavelength-division demultiplexed by the WDM filter 501. After that, the resultant demultiplexed signals are converted into electrical signals by the optical reception interface 502, then being converted into a digital bit string after being subjected to a process which will be explained later in FIG. 6. The optical reception interface 502 is capable of processing the received optical signal at the two transfer rates, i.e., 10 Gbit/s and 2.4 Gbit/s. The control unit 511 performs the selection control so that the optical reception interface 502 can receive the signal at the transfer rate instructed from the OLT 200 (i.e., 44 in FIG. 2). Subsequently, the PON-frame separation unit 505 performs the separation of the signal explained in FIG. 2. Concretely, the signals in the PLOAM area 22 and the grant instruction area 23 are transferred to the control unit 511. Then, of the signals in the frame payload area 24, the portion which is judged to be addressed to the station of its own from the transfer-range instruction from the OLT 200 (i.e., 41, 42, and 43 in FIG. 2) is transmitted to the frame distribution unit 506. Moreover, user signals outputted from the frame distribution unit 506, after being temporarily stored in the packet buffer 507-1 and the packet buffer 507-2, are outputted via the UNI (User-Network Interface) 508-1 and the UNI (User-Network Interface) 508-2, respectively.

Also, signals inputted from the UNI (User-Network Interface) 508-1 and the UNI (User-Network Interface) 508-2, after being temporarily stored in the packet buffer 509-1 and the packet buffer 509-2, are read under control by the transmission control unit 510. Furthermore, the read signals are integrated into a packet by the PON-frame generation unit 504. The queue-length monitoring unit 530 monitors usage amounts of the packet buffers 509-1 and 509-2. The buffer usage-amount information is stored in the upstream signal 140, then being transferred to the OLT 200. The OLT 200 performs the DBA processing based on this information, thereby controlling the grant amount that the OLT 200 should issue. The packet integrated by the PON-frame generation unit 504 is converted into an optical signal by the optical transmission interface 503. Subsequently, this optical signal is transferred to the branch-line optical fiber 120 via the WDM filter 501. Based on the grant amount extracted from the control unit 511, the transmission control unit 510 performs the control of transmitting the signal to the OLT 200.

Incidentally, the above-described respective function blocks of each ONU 300 are implemented using firmware accumulated into CPU or memory, or using such electric components as electro-optical conversion circuits, memories, and amplifiers. Also, the functions of these function blocks may be implemented using special-purpose hardware (such as LSI) which is made specific to each of the processes. Furthermore, being not limited to the above-described explanation, the configuration of each ONU 300 may be set such that various functions are appropriately implementable depending on the requirements.

Figure 4:
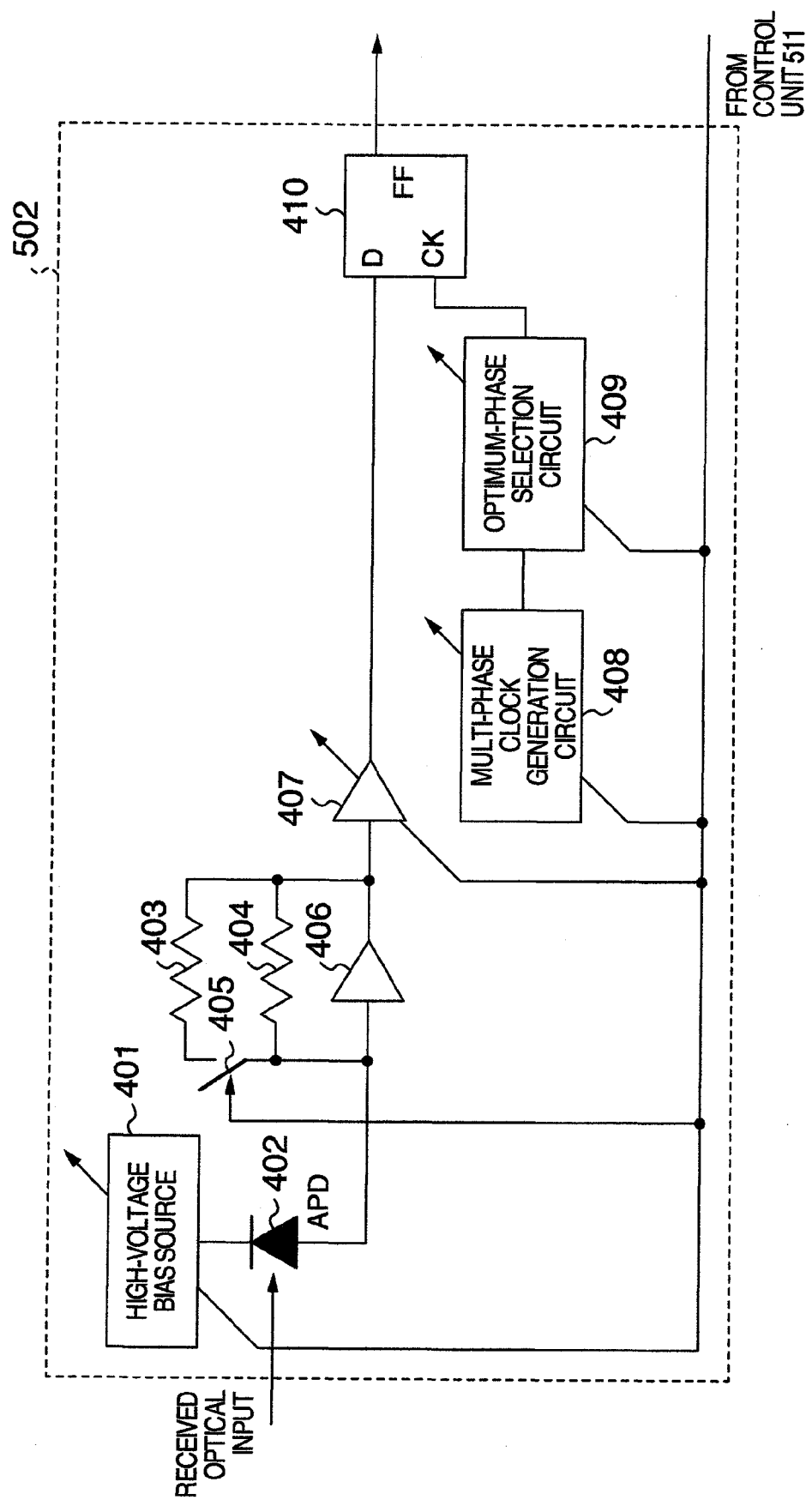
FIG. 4 is a block configuration diagram for illustrating a configuration example of an optical reception interface.

FIG. 4 is a block configuration diagram for illustrating a detailed configuration example of the optical reception interface 502.

An APD 402, which is connected to a high-voltage variable bias source 401, is inversely-biased by the high voltage. As a result, the APD 402 amplifies the received optical signal on the basis of the avalanche effect, then converting the amplified optical signal into an electric current. This amplification operation allows the data to be correctly identified even in a case where a 1-Gbit/s-exceeding high-rate signal is inputted as an about 30-dB infinitesimal optical signal. The resultant electric current is voltage-converted by a transimpedance amplifier (TIA) including resistors 403 and 404 and an amplifier 406. Subsequently, the signal, after being amplified by a variable-gain amplifier 407, is converted into a digital bit string by a flip-flop circuit 410. Here, the clock to be inputted into the flip-flop 410 is generated by an optimum-phase selection circuit 409 for selecting a clock, which is the closest to the optimum identification point of the signal, from among outputs of a multi-phase clock generation circuit 408. Of the above-described configuration, the high-voltage variable bias source 401 outputs the bias voltage in response to the transfer rate in accordance with the control from the control unit 511, thereby amplifying the received signal appropriately. Also, a switch 405 makes a selection of the resistors 403 and 404 in response to the transfer rate in accordance with the control from the control unit 511, then determining the bandwidth and transformation impedance gain. The variable-gain amplifier 407 sets the gain in response to the transfer rate in accordance with the control from the control unit 511. The multi-phase clock generation circuit 408 outputs a multi-phase clock of a frequency in response to the transfer rate in accordance with the control from the control unit 511. The optimum-phase selection circuit 409 selects the clock which is the closest to the optimum identification point in response to the transfer rate in accordance with the control from the control unit 511.

Figure 5:
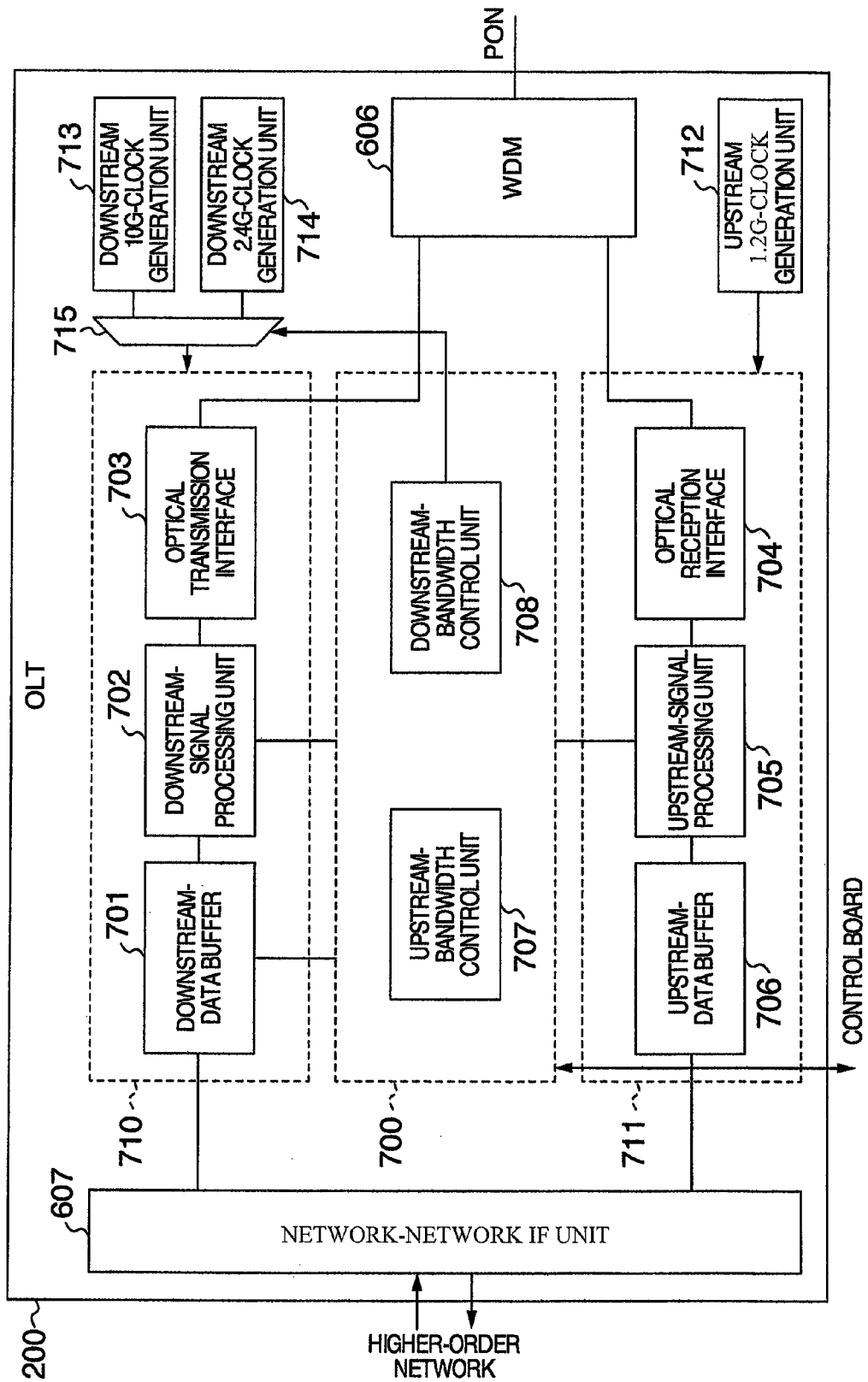
FIG. 5 is a block configuration diagram for illustrating a configuration example of the OLT.

FIG. 5 is a block configuration diagram for illustrating a configuration example of the OLT 200 used in the PON of the present invention.

The OLT 200 includes a NNI (Network-Network Interface) unit 607, a control unit 700, a transmission unit 710, a reception unit 711, and a WDM 606. The transmission unit 710 includes a downstream-data buffer 701, a downstream-signal processing unit 702, and an optical transmission interface 703. Also, the reception unit 711 includes an optical reception interface 704, an upstream-signal processing unit 705, and an upstream-data buffer 706. The operation clock for the reception unit 711 is supplied from an upstream 1.2 G-clock generation unit 712. The operation clock for the transmission unit 710 is supplied such that an output from either a downstream 10 G-clock generation unit 713 or a downstream 2.4 G-clock generation unit 714 is selected by a selector 715. This selector control is performed by a downstream-bandwidth control unit 708. Concerning a concrete determination method for the transfer rate, a detailed explanation will be given later referring to the drawings.

The downstream-data buffer 701 temporarily accumulates data received from the higher-order network 20 via the NNI (Network-Network Interface) unit 607. The downstream-signal processing unit 702 performs a processing needed for relaying the optical signal from the higher-order network 20 all the way to each ONU 300. The integration of the downstream signal 130 explained in FIG. 2 is performed in this block. The downstream grant instruction (i.e., 31 in FIG. 2), which is outputted from the downstream-bandwidth control unit 708 in accordance with a method which will be explained later, is stored into the downstream frame. The optical transmission interface 703 converts the electrical signal to an optical signal, then transmitting the optical signal (downstream signal) to each ONU 300 via the WDM 606. The optical reception interface 704 converts an optical signal, which is received from each ONU 300 via the WDM 606, to an electrical signal. The upstream-signal processing unit 705 performs a processing needed for relaying the optical signal from each ONU 300 all the way to the higher-order network 20. The upstream-data buffer 706 temporarily accumulates the data which is to be transmitted to the higher-order network 20 via the NNI (Network-Network Interface) unit 607. The control unit 700, which is connected to the above-described respective function blocks, executes respective types of processing needed for performing the communications (such as monitor/control) with the plurality of ONUs 300. Also, the control unit 700 has the function for relaying the signals between the higher-order network 20 and the ONUs 300.

An upstream-bandwidth control unit 707 performs the dynamic bandwidth assignment (: DBA) processing of determining what amount of communications bandwidth the OLT 200 should assign to each of the ONUs 300 (TCONT) that the OLT 200 has contained for each DBA period determined in advance and within this DBA period. The downstream-bandwidth control unit 708 determines what amount of signal the OLT 200 should transfer to each of the ONUs 300 that the OLT 200 has contained for each period determined in advance and within this period. The control unit 700 performs communications with a control board (e.g., maintenance terminal configured with PC) provided in the PON. In this way, the control unit 700 sets control parameters (e.g., membership condition and contract traffic on each ONU) needed for the control in the control unit in advance, or receives monitoring information (e.g., failure occurrence situation and transmission-permitted data amount in each ONU) based on a request from the maintainer.

Incidentally, the above-described respective function blocks of the OLT 200 are implemented using firmware accumulated into CPU or memory, or using such electric components as electro-optical conversion circuits, memories, and amplifiers. Also, these function blocks may be implemented using special-purpose hardware (such as LSI) which is made specific to each of the processings.

Figure 6:
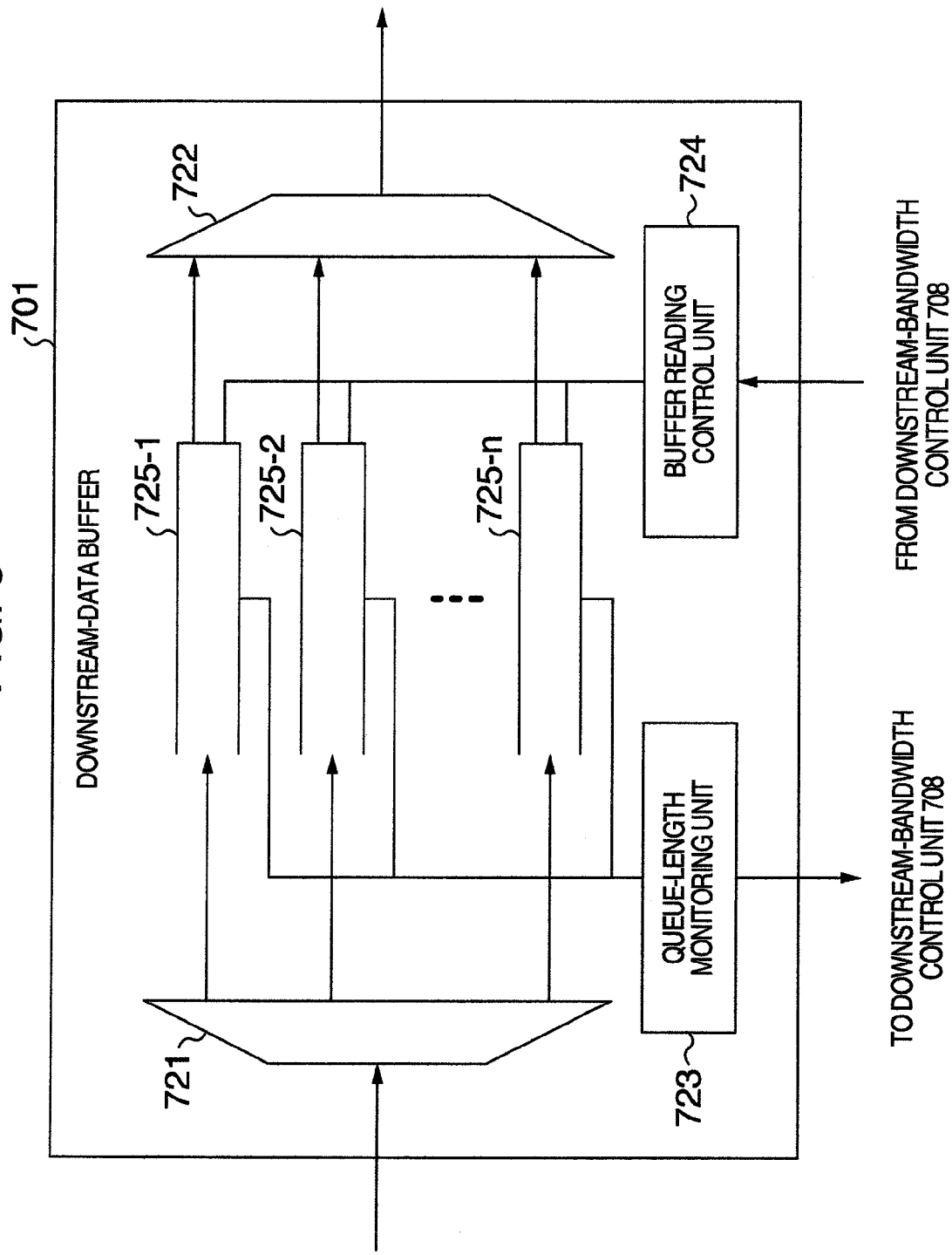
FIG. 6 is a block configuration diagram for illustrating a configuration example of a downstream packet buffer.

FIG. 6 is a block configuration diagram for illustrating a configuration example of the downstream-data buffer 701 provided in the OLT 200.

The downstream-data buffer 701 includes a distribution unit 721, a multiplexing unit 722, a queue-length monitoring unit 723, a buffer reading control unit 724, and packet buffers 725 (725-1 to 725-n). The data received from the higher-order network 20 via the NNI (Network-Network Interface) unit 607 is distributed on each destination-address basis by making reference to, e.g., the label of VLAN. Then, the distributed data are temporarily accumulated into the packet buffers 725 provided on each destination-address basis. The queue-length monitoring unit 723 monitors the queue length of each packet buffer 725, then notifying the downstream-bandwidth control unit 708 about the queue length monitored. In accordance with the instruction from the downstream-bandwidth control unit 708, the buffer reading control unit 724 reads the data out of the instructed packet buffer 725 by the instructed amount, then transmitting the read data to the subsequent stage via the multiplexing unit 722.

Figure 7:
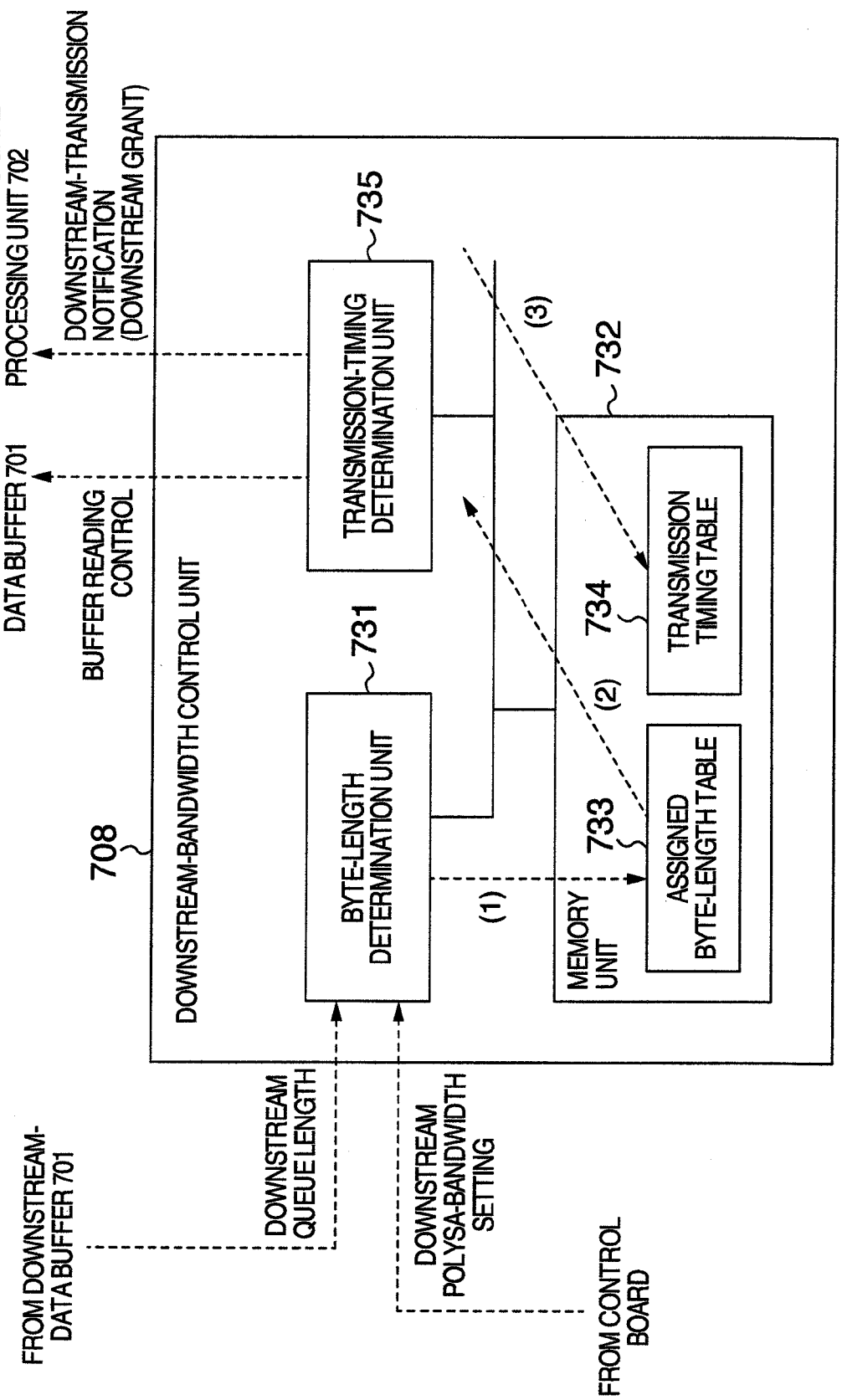
FIG. 7 is an explanatory diagram for explaining the configuration of an OLT control unit and an operation example thereof.
Figure 8:
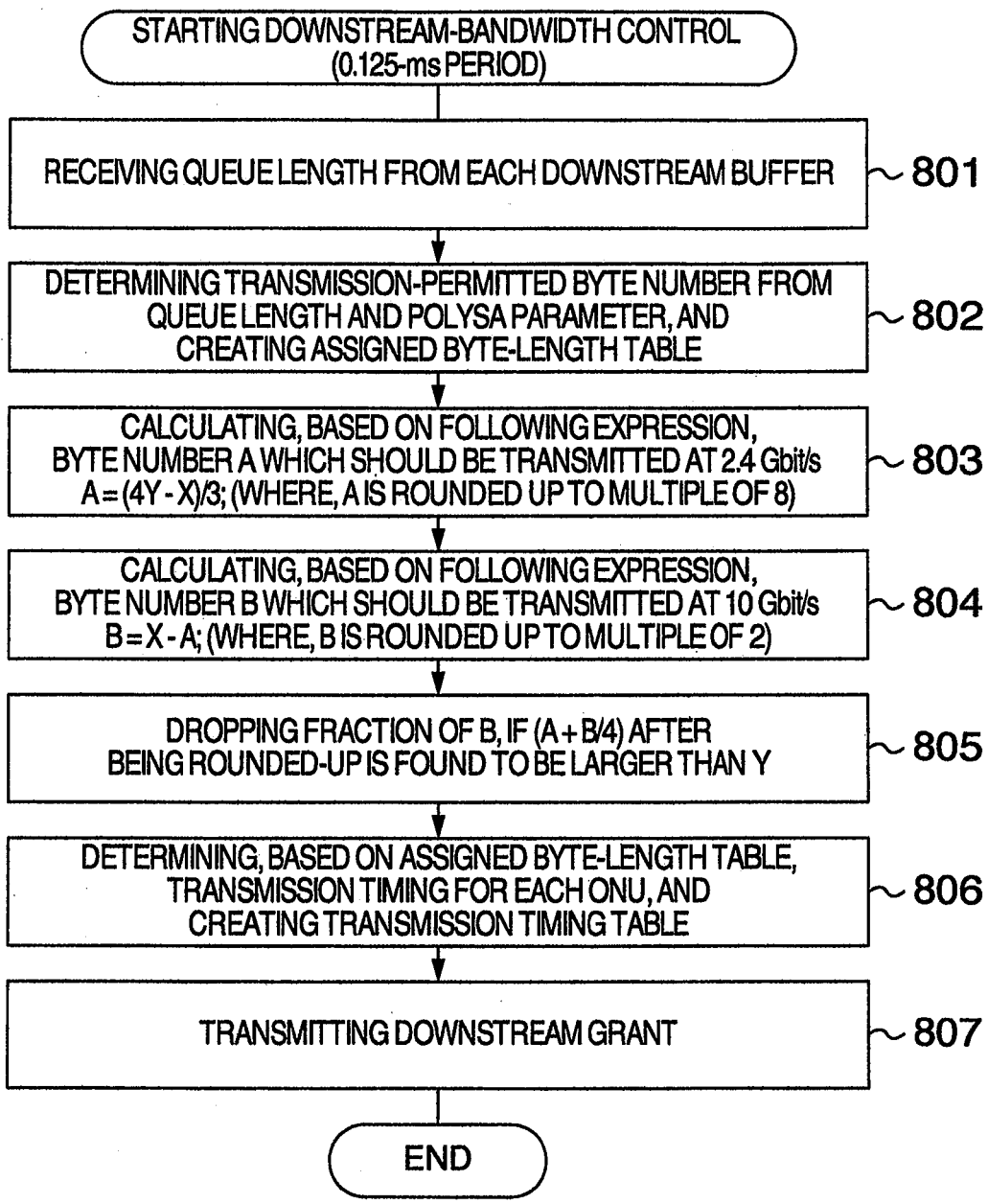
FIG. 8 is an operation flow diagram for illustrating the operation example of the OLT control unit.
Figure 9:
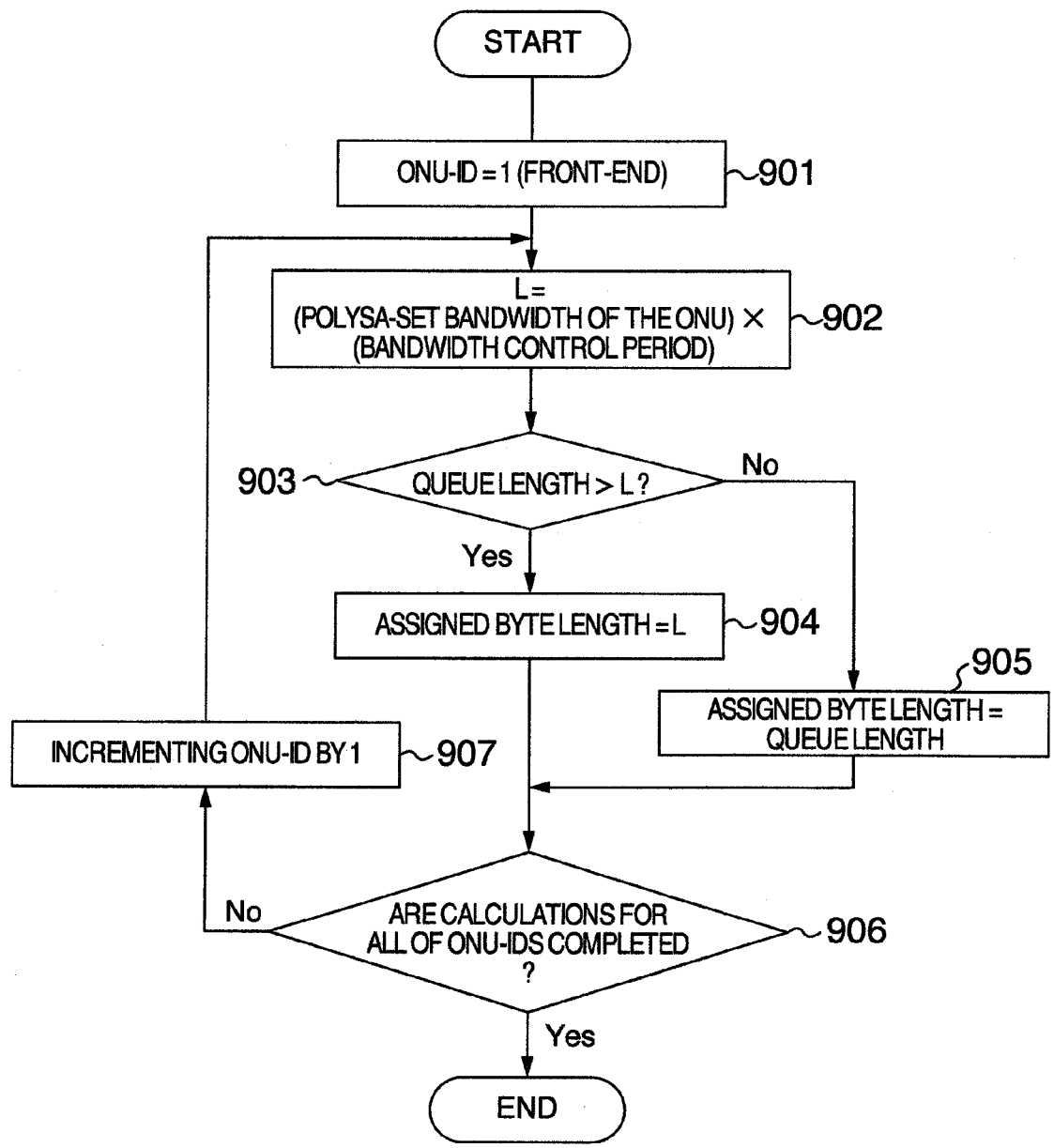
FIG. 9 is an operation flow diagram for illustrating another (i.e., the second) operation example of the OLT control unit similarly.
Figure 10:
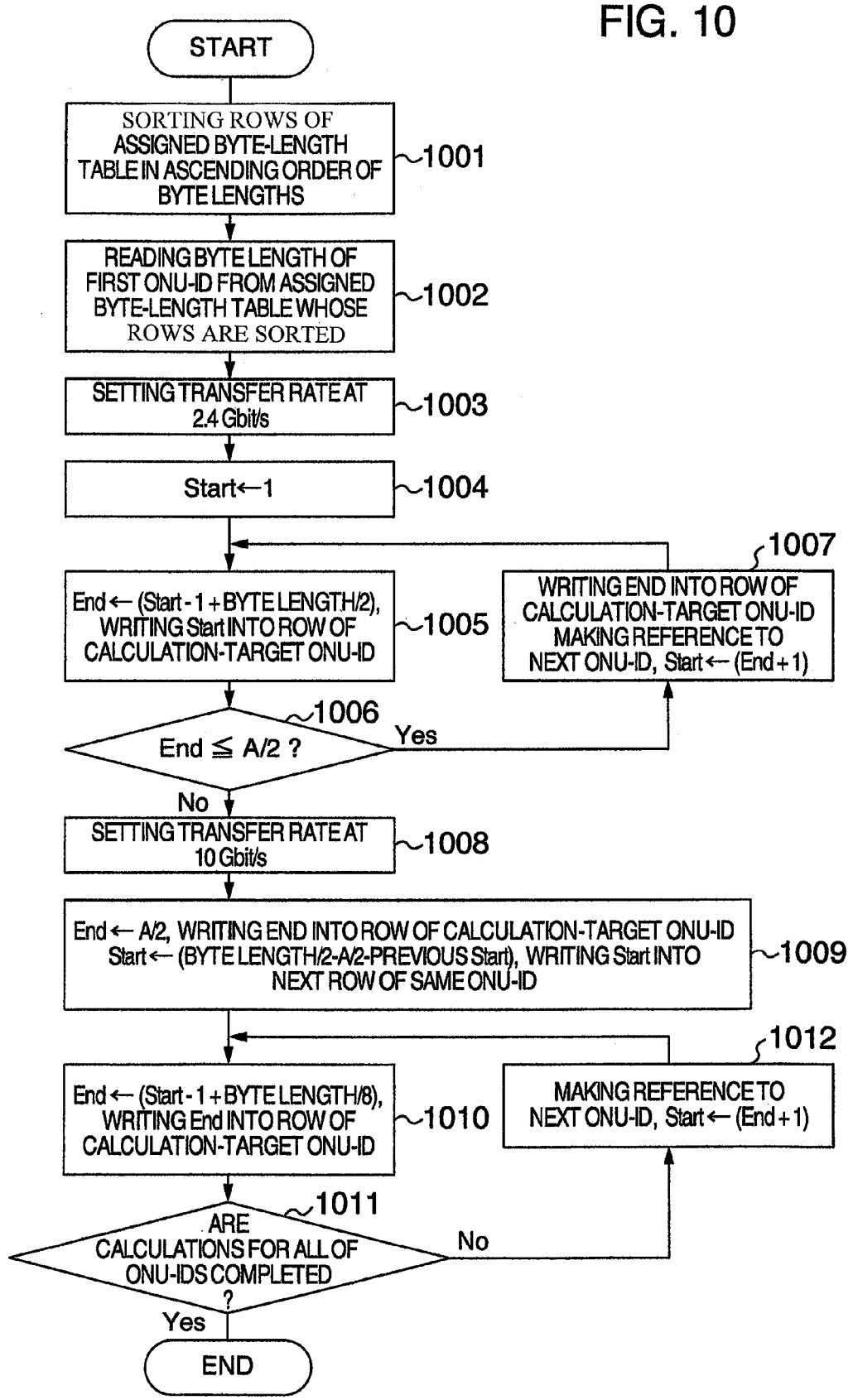
FIG. 10 is an operation flow diagram for illustrating still another (i.e., the third) operation example of the OLT control unit similarly.

FIG. 7 is an explanatory diagram for explaining the configuration and an operation example of the downstream-bandwidth control unit 708 provided in the OLT 200. Also, FIG. 8, FIG. 9, and FIG. 10 are operation flow diagrams for respectively illustrating operation examples of the control unit provided in the OLT 200. Moreover, FIGS. 11A and 11B are memory configuration diagrams for illustrating configuration examples of respective tables generated by the control unit. More specifically, FIGS. 11A and 11B are the memory configuration diagrams for illustrating configuration examples of an assigned byte-length table 733 for memorizing the bandwidth (i.e., number of the bytes) assigned for each ONU 300, and a transmission timing table 734 for memorizing the signal transmission timing and used transfer rate for each ONU 300.

Hereinafter, referring to these drawings, a detailed explanation will be given below concerning the operation and configuration of the PON of the present invention; more concretely, regarding the operation and configuration of the bandwidth-assignment and used-transfer-rate determinations for each ONU 300 carried out by the OLT 200.

(1) A byte-length determination unit 731 of the downstream-bandwidth control unit 708 receives the queue length from the queue-length monitoring unit 723. Here, the queue length is the amount of data accumulated by each packet buffer 725 with a schedule of being addressed to each ONU 300 within the downstream-bandwidth control period (i.e., 0.125 ms in the present embodiment) (FIG. 8: 801).

Based on a contract, the polysa bandwidth, i.e., maximum bandwidth parameter made permissible for each ONU 300, is set to the byte-length determination unit 731 from the control board (refer to FIG. 5) by the maintainer. Accordingly, based on the values of the queue length received and the polysa bandwidth set in advance, the unit 731 determines the number of the bytes (i.e., downstream communications bandwidth) which will be transmitted to each ONU 300. Moreover, the unit 731 creates the assigned byte-length table 733, then storing the table 733 into a memory unit 732 (FIG. 7: (1), FIG. 8: 802). In the assigned byte-length table 733, the ONU-ID, i.e., identifier of each ONU 300, and the assigned byte length are described on a one-to-one correspondence basis.

Incidentally, as illustrated in FIG. 11A, the assigned byte-length table 733 is configured such that the ONU-ID 901, i.e., identifier of each ONU 300, and the assigned byte length 902 to be transmitted to each ONU are memorized.

(2) A transmission-timing determination unit 735 performs the following calculation, thereby determining how many bytes should be transmitted at 10 Gbit/s and how many bytes should be transmitted at 2.4 Gbit/s within the downstream frame payload 24 of the 2.4 G/10 G-mixed frame 20:

As explained earlier, when only the 2.4-Gbit/s signals are contained into the frame payload 24 of the 2.4 G/10 G-mixed frame 20, the signals of 310508 bytes can be contained therein. The total of the byte lengths assigned to the respective packet buffers 725 in the above-described (1) is denoted by X, and 310508 bytes, which are obtained when only the 2.4-Gbit/s signals are contained into the frame payload 24, are denoted by Y. Here, of the total of the byte lengths assigned in (1), the number of the bytes which should be transmitted at 2.4 Gbit/s is made equal to A, and the number of the bytes which should be transmitted at 10 Gbit/s is made equal to B. Then, in the situation where the X bytes are embedded into the frame payload 24 and where the frame payload 24 is completely filled with the X bytes, the following Expressions hold:

$$A+B=X \quad \text{(Expression 1)}$$

$$A+B/4=Y \quad \text{(Expression 2)}$$

Solving these simultaneous equations gives the following Expressions as the solutions:

$$A=(4Y-X)/3 \quad \text{(Expression 3)}$$

$$B=X-A \quad \text{(Expression 4)}$$

Accordingly, first, the byte number A, which should be transmitted at 2.4 Gbit/s, is calculated from (Expression 3) (where, A is rounded up to a multiple of 8, FIG. 8: 803). Subsequently, the byte number B, which should be transmitted at 10 Gbit/s, is calculated from (Expression 4) (where, B is rounded up to a multiple of 2, FIG. 8: 804). This round-up processing is needed because of the employment of the configuration explained earlier: The time unit is defined and specified using the byte number in the 1.2-Gbit/s transfer rate which is the slowest transfer rate of all the upstream and downstream transfer rates, and the time unit of the 2.4-Gbit/s signal is specified in the 2-byte unit, and the time unit of the 10-Gbit/s signal is specified in the 8-byte unit. If (A+B/4) after being rounded-up is found to be larger than Y, the fraction of B is dropped (FIG. 8: 805). In the case of X<Y, however, the above-described Expressions do not hold. Consequently, all of the bytes can be transferred at 2.4 Gbit/s.

(3) The transmission-timing determination unit 735 reads the contents of the assigned byte-length table 733 (FIG. 7: (2)). Moreover, based on the contents read, the unit 735 assigns, within each frame period, the time slot corresponding to the byte length 902 which will be transmitted to each ONU. Furthermore, the unit 735 creates the transmission timing table 734, then storing the table 734 into the memory unit 732 (FIG. 7: (3), FIG. 8: 806). In the transmission timing table 734, the ONU-ID and, the signal transmission timing and used transfer rate assigned within each frame period are described on a one-to-one correspondence basis.

(4) The transmission-timing determination unit 735, based on the transmission timing table 734, passes the downstream grant value to the downstream-signal processing unit 702, thereby transmitting the value (FIG. 8: 807).

FIG. 9 is an operation flow diagram for illustrating the operation executed at the processing step 802 and determining the byte number which will be transmitted to each ONU 300.

The determination of the byte number transmitted to each ONU is performed as follows: First, the determination is started from an ONU whose ONU-ID=1 (901). Then, the polysa-permissible byte length L is determined based on the following Expression:

L=(polysa-set bandwidth of the ONU)×(bandwidth control period=0.125 ms) (Expression 5) (902). Here a comparison is made between the queue length addressed to this calculation-target ONU and the value of the polysa-permissible byte length L (903). Moreover, if the queue length is larger, the assigned byte length to the ONU is set at the value of L (904). Meanwhile, if the queue length is smaller, the assigned byte length to the ONU is set at the queue length (905). This operation is repeated until the ONU-ID becomes the last ONU-ID (906, 907).

FIG. 10 is an operation flow diagram for illustrating the operation executed at the processing step 806 and determining the transmission timing.

(E1) First, the rows of the assigned byte-length table 733 are sorted in an ascending order of the byte lengths (1001). This processing is carried out in order to assign the lowest-possible transfer rate to an ONU 300 for which a less amount of data transmission is effective enough. After the sorting, the assigned byte length of the first ONU-ID is read from the assigned byte-length table 733 (1002). Here, the transfer rate is set at 2.4 Gbit/s (1003), then substituting 1 into the Start (1004).

(E2) The End is calculated based on (Start−1+byte length/ 2), then writing the Start value into the row of the calculation-target ONU-ID (1005). The calculated End value is compared with the value of A/2 (A is the byte number which is explained in FIG. 8, and which should be transmitted at 2.4 Gbit/s) (1006). Moreover, if the End value is equal to or smaller, the End value is written into the row of the calculation-target ONU-ID, then making reference to the next ONU-ID, and substituting (End+1) into the Start (1007). Furthermore, the calculation is repeated.

(E3) Meanwhile, if the End value is larger, the transfer rate is set at 10 Gbit/s (1008), then writing the value of A/2 into the row of the calculation-target ONU-ID as the End. After that, (byte length/2−A/2−previous Start value) is substituted into the Start, then writing the new Start value into the new row of the same ONU-ID (1009).

(E4) The End is calculated based on (Start−1+byte length/ 8), then writing the End value into the row of the calculation-target ONU-ID (1010).

(E5) The operation is repeated until the calculations for all of the ONU-IDs have been completed (1010 to 1012).

As explained so far, the data transfer is performed by taking advantage of the lowest-possible transfer rate with respect to an ONU 300 for which a lesser amount of data transmission is effective enough. This transfer method makes it possible to reduce the power consumption of the ONU 300 which exhibits less transfer bandwidth. FIG. 11B illustrates an example of the result obtained by writing, into the transmission timing table 734, such values as the signal transmission timings determined by executing the present calculation.

Figure 12:
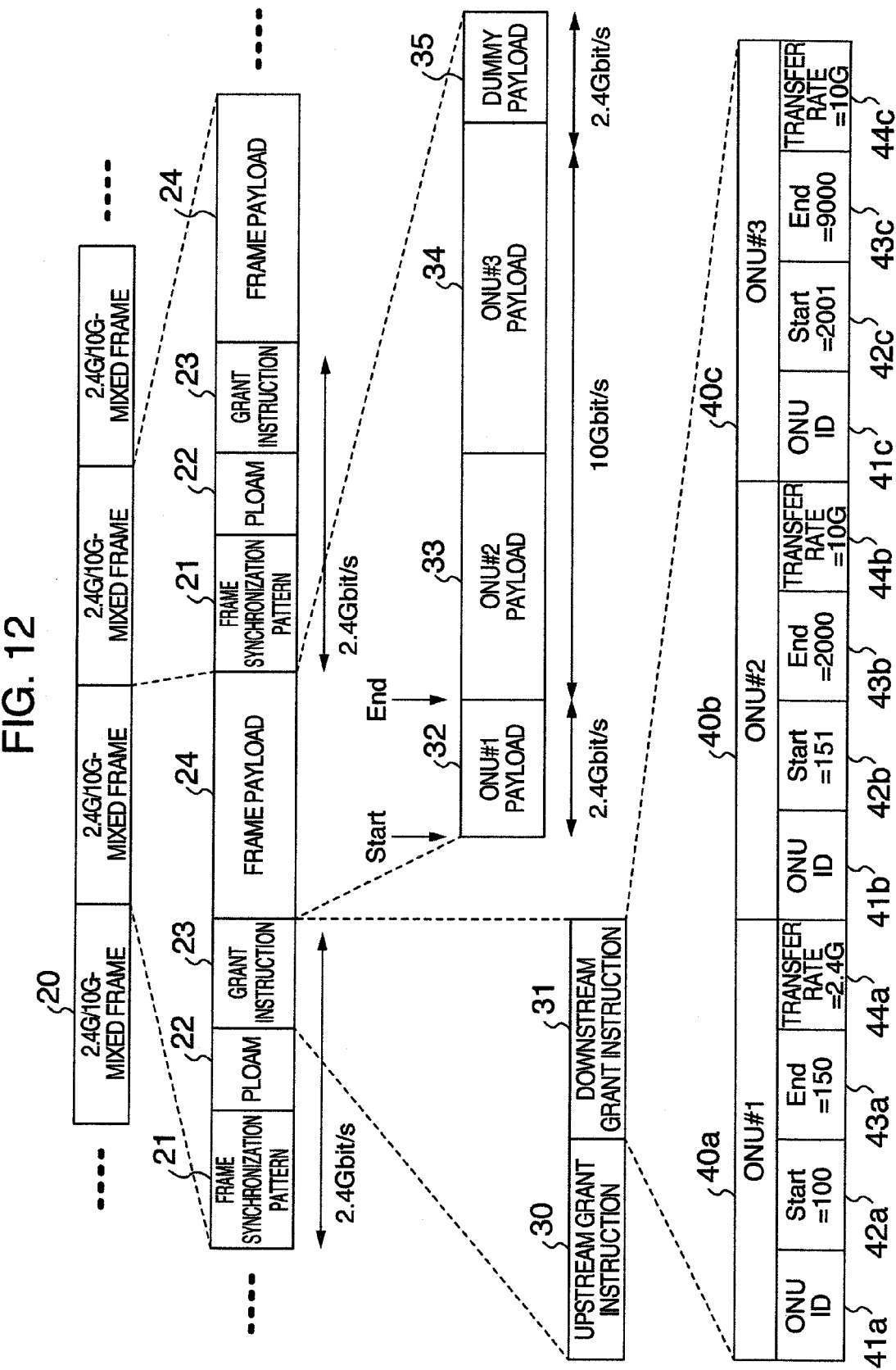
FIG. 12 is a frame configuration diagram for illustrating another configuration example of the downstream signal.

FIG. 12 is a frame configuration diagram for illustrating another configuration example of the downstream signal.

The point that differs from the frame configuration explained earlier in FIG. 2 is that a dummy payload 35 transferred at 2.4 Gbit/s is set up at the last trailer of the frame payload 24. The insertion of this dummy payload 35 becomes necessary from an occurrence of the following case: Namely, when a circuit as explained earlier in FIG. 4 is used as the optical reception interface 502 of each ONU 300, if the transfer rate changes from 10 Gbit/s to 2.4 Gbit/s, this circuit necessitates a time from a few hundreds of nanoseconds to a few μs in order to synchronize with this change in compliance therewith. The frame synchronization pattern 21 that follows a certain frame is the periodic signal that all of the ONUs 300 must receive. The insertion of the dummy payload 35 makes it possible to ensure the time for the optical reception interface 502 of each ONU 300 to synchronize with the change, thereby allowing the frame synchronization pattern 21 to be received without fail. The optimum configuration of a concrete value of the dummy payload 35 is a configuration of using "10 alternating pattern", which is convenient for both the signal amplitude adjustment and the clock synchronization. The present invention, however, is not needed to be limited to this value. Also, the length of the dummy payload 35 is set in advance in harmony with the characteristics of an optical reception circuit to be used.

Figure 13:
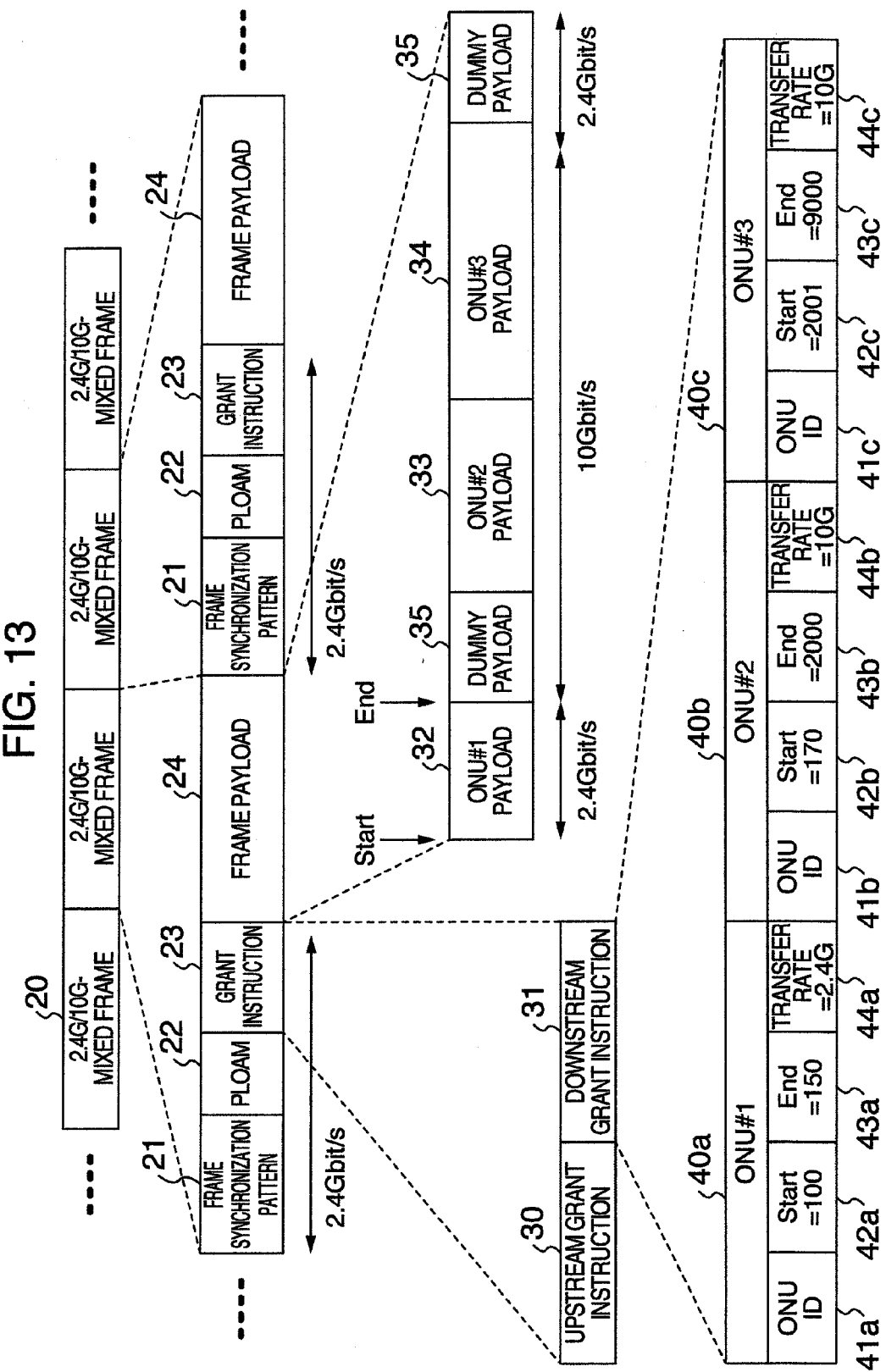
FIG. 13 is a frame configuration diagram for illustrating another configuration example of the downstream signal similarly.

FIG. 13 is also a frame configuration diagram for illustrating another configuration example of the downstream signal. In this configuration, the dummy payload 35 is also inserted when the transfer rates of the adjacent ONU-addressed signal payloads change in the frame payload 24. In FIG. 13, the dummy payload 35 is also inserted between the ONU#1-addressed signal payload 32 whose transfer rate is equal to 2.4 Gbit/s and the ONU#2-addressed signal payload 33 whose transfer rate is equal to 10 Gbit/s. When taking advantage of the frame of the configuration in FIG. 13, the ONU#2 monitors the Start value of the ONU-ID#2 of the downstream grant instruction 31, thereby waiting for a timing at which the 10-bit/s signal is supposed to be received. In this way, the ONU#2 causes the optical reception interface to operate so that the synchronization of the interface becomes implementable. Also, the following configuration is allowable: The monitoring is performed with respect to the End value of the ONU-ID#1 and the Start value of the ONU-ID#2 of the downstream grant instruction 31. Moreover, the resynchronization of the optical reception interface is started immediately after the End value of the ONU-ID#1, thereby establishing the synchronization of the interface such that the time for the dummy payload 35 is spent. This configuration has a merit of making it easy to apply the continuous-light-transfer-dedicated devices used conventionally.

Figure 14:
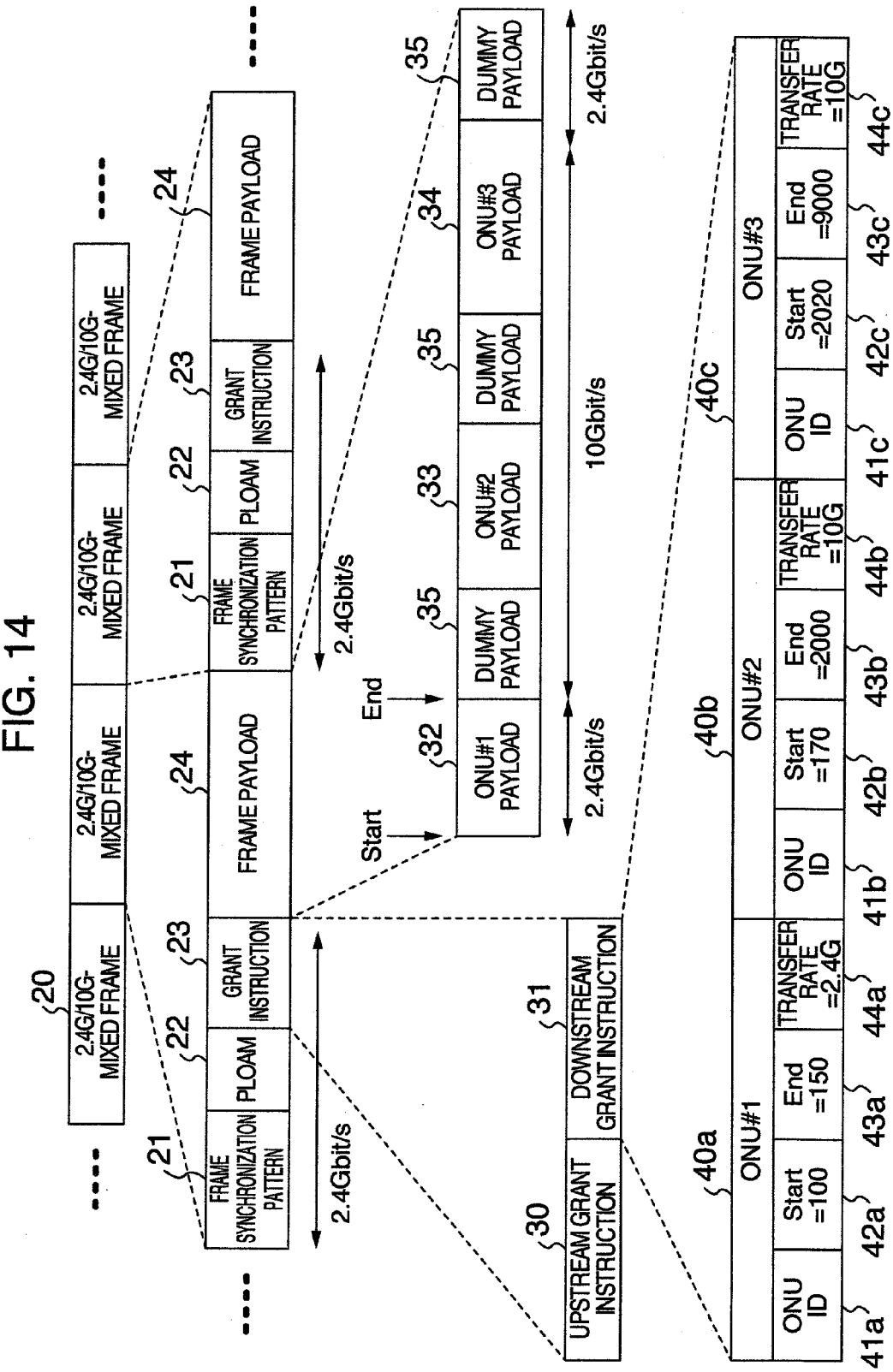
FIG. 14 is a frame configuration diagram for illustrating another configuration example of the downstream signal similarly.

FIG. 14 is also a frame configuration diagram for illustrating another configuration example of the downstream signal. In this configuration, the dummy payload 35 is inserted into transit places between all of the ONU-addressed signal payloads. The use of this frame reduces the transmittable (i.e., assigned) data amount by an amount equivalent to the plurality of dummy payloads 35. A configuration, however, is made implementable where each ONU 300 stops the optical reception interface until immediately before the reception of an its-own-station-addressed signal, and can establish the synchronization of the interface by taking advantage of the dummy payloads 35. This configuration results in a possibility of being capable of reducing the power consumption.

Figure 15:
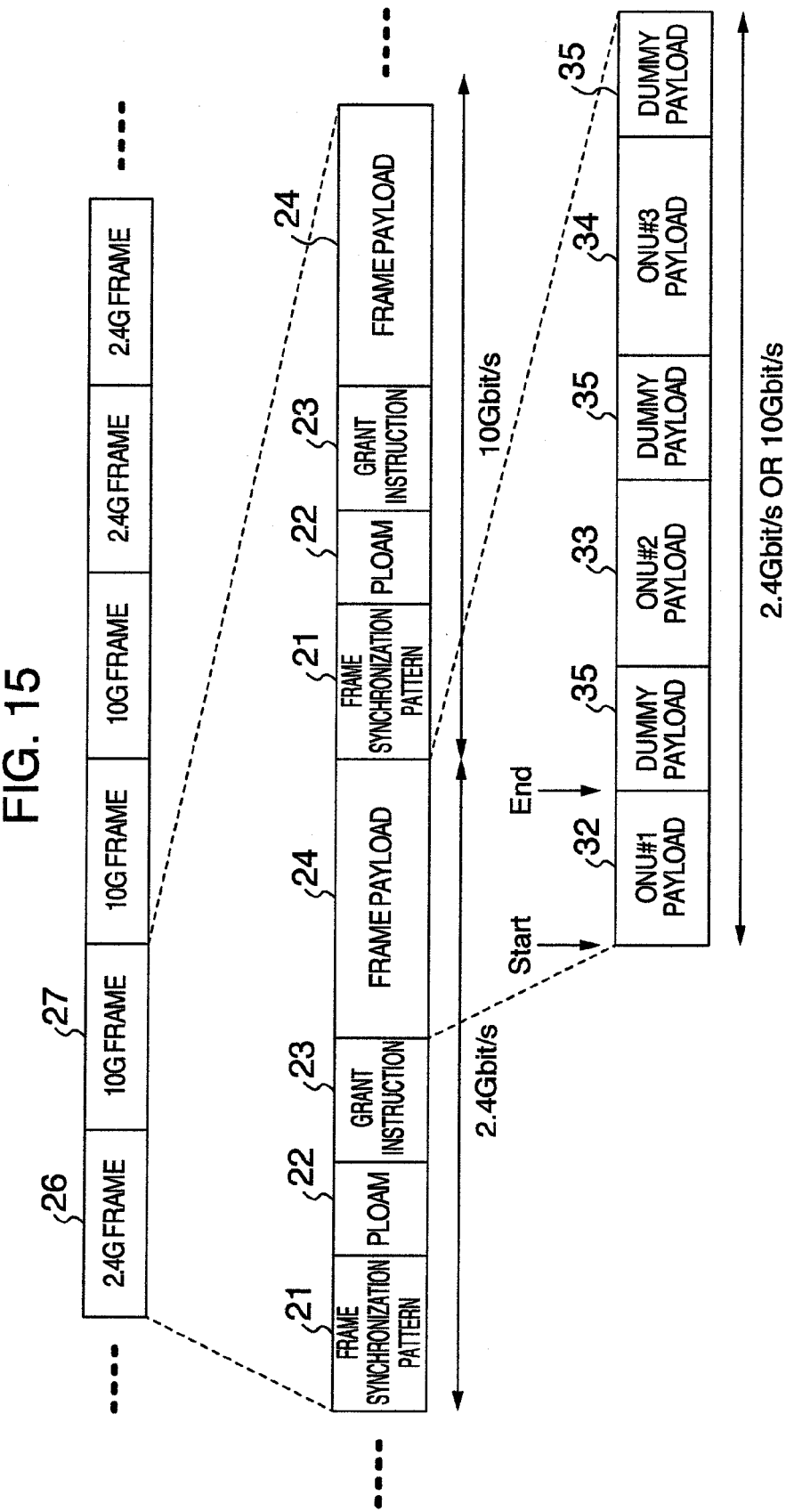
FIG. 15 is a frame configuration diagram for illustrating still another configuration example of the downstream signal similarly.

FIG. 15 is also a frame configuration diagram for illustrating still another configuration example of the downstream signal. In this configuration, there exist the two types of frames, i.e., the frames transferred at 2.4 Gbit/s and the frames transferred at 10 Gbit/s. Furthermore, the optimization of the transfer rates is carried out by adjusting the transmission frequency of each frame.

Figure 16:
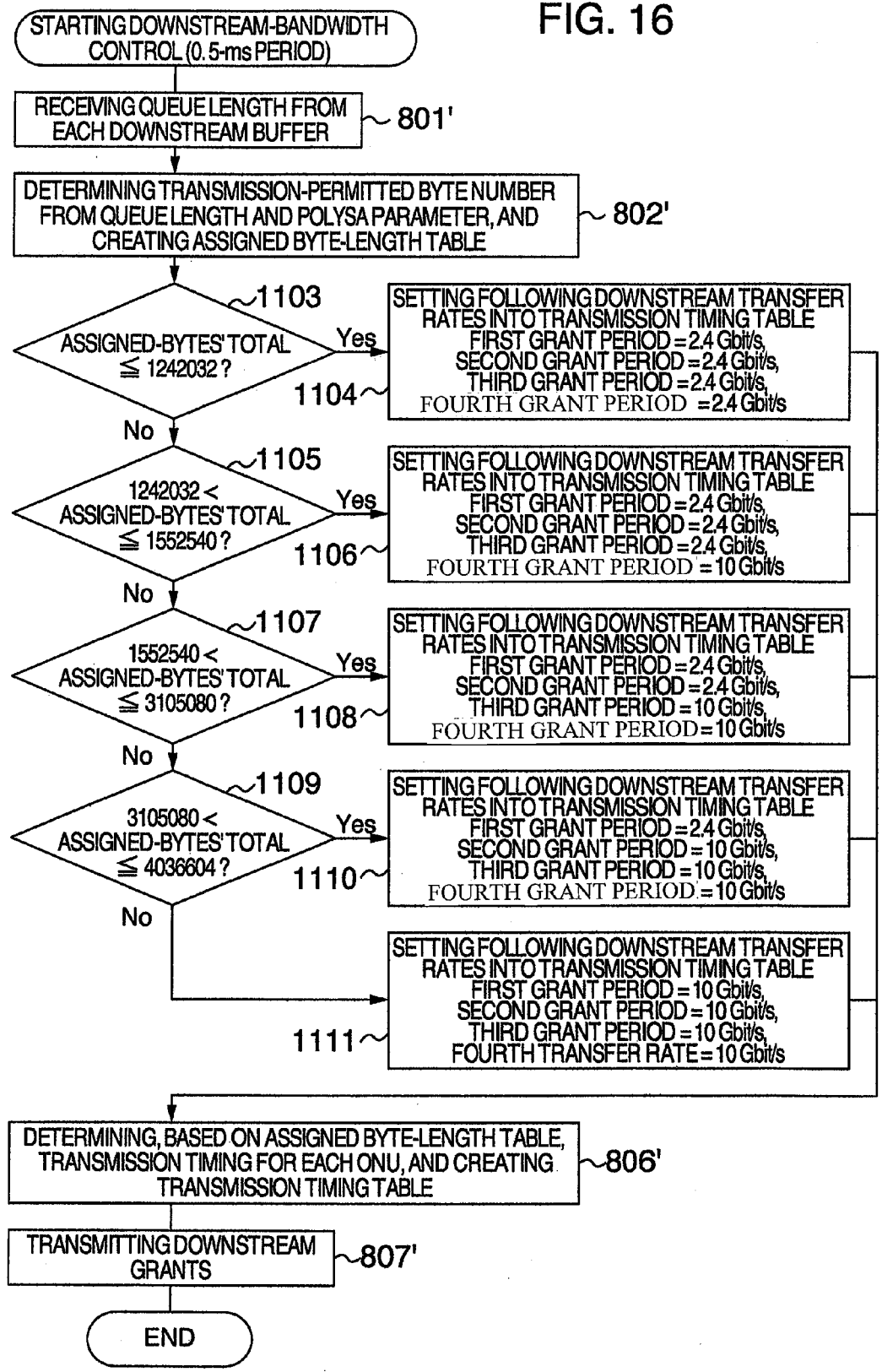
FIG. 16 is an operation flow diagram for illustrating another operation example of the OLT control unit.

Hereinafter, an explanation will be given below concerning the bandwidth-assignment method in the case where these frames are used. FIG. 16 is an operation flow diagram for illustrating another operation example of the OLT control unit. More specifically, FIG. 16 illustrates a downstream-signal assignment operation example for each ONU 300 in the case where the frames illustrated in FIG. 15 are used as the downstream signals.

In the present operation example, a single bandwidth control period (0.5 ms) is constituted with four frame periods (125 μs each). As a result, the number of the bytes which are transmittable within the single bandwidth control period in the case where the transfer rate is 2.4 Gbit/s becomes equal to 1242032 bytes (=310508 bytes×4 periods), using the numerical values explained earlier. Namely, if the total of the queue lengths, i.e., the transmission-await data amount from all of the ONUs 300, is smaller than 1242032 bytes, all of the assigned data are transmittable at the 2.4-Gbit/s transfer rate. Meanwhile, if the total of the queue lengths is larger than 1242032 bytes, all of the requested data cannot be transferred at the 2.4-Gbit/s transfer rate. Accordingly, the transfer rate needs to be raised up to 10 Gbit/s in this case.

Here, in a case where, of the four frame periods which constitute the single bandwidth control period, three frame periods are transferred at the 2.4-Gbit/s transfer rate, and where the remaining one frame period is transferred at the 10-Gbit/s transfer rate, the byte number transmittable within the bandwidth control period can be raised up to 1552540 bytes (=310508×3 periods+1242032×1 period). Similarly, in a case where, of the four frame periods, two frame periods are transferred at the 2.4-Gbit/s transfer rate, and where the remaining two frame periods are transferred at the 10-Gbit/s transfer rate, the byte number transmittable within the bandwidth control period can be raised up to 3105080 bytes (=310508×2 periods+1242032×2 periods). Moreover, in a case where, of the four frame periods, one frame period is transferred at the 2.4-Gbit/s transfer rate, and where the remaining three frame periods are transferred at the 10-Gbit/s transfer rate, the byte number transmittable within the bandwidth control period can be raised up to 4036604 bytes (=310508×1 period+1242032×3 periods). Finally, in a case where all of the four frame periods are transferred at the 10-Gbit/s transfer rate, the byte number transmittable within the bandwidth control period can be raised up to 4968128 bytes (=1242032×4 periods).

Consequently, based on the total of the assigned byte lengths acquired from an assigned byte-length table 733', the transmission-timing determination unit 735 determines the transfer rates as follows: Moreover, the unit 735 inputs the values of the determined transfer rates into the respective frame periods (which, hereinafter, will be referred to as "grant periods" in some cases) of a transmission timing table 734'.

(A) The transmission-timing determination unit 735 judges whether or not an inequality of the total of the assigned byte lengths 1242032 holds (FIG. 16: 1103). In the case of Yes, the unit 735 determines all of the grant periods as being the 2.4-Gbit/s transfer rate (FIG. 16: 1104).

(B) The unit 735 judges whether or not an inequality of 1242032<the total of the assigned byte lengths≦1552540 holds (FIG. 16: 1105). In the case of Yes, the unit 735 determines the first to third grant periods as being the 2.4-Gbit/s transfer rate, and the fourth grant period as being the 10-Gbit/s transfer rate (FIG. 16: 1106).

(C) The unit 735 judges whether or not an inequality of 1552540<the total of the assigned byte lengths≦3105080 holds (FIG. 16: 1107). In the case of Yes, the unit 735 determines the first and second grant periods as being the 2.4-Gbit/s transfer rate, and the third and fourth grant periods as being the 10-Gbit/s transfer rate (FIG. 16: 1108).

(D) The unit 735 judges whether or not an inequality of 3105080<the total of the assigned byte lengths≦4036604 holds (FIG. 16: 1109). In the case of Yes, the unit 735 determines the first grant period as being the 2.4-Gbit/s transfer rate, and the second to fourth grant periods as being the 10-Gbit/s transfer rate (FIG. 16: 1110). Also, in the case of No, the unit 735 determines all of the grant periods as being the 10-Gbit/s transfer rate (FIG. 16: 1111).

(E) Having determined the transfer rates of the respective grant periods, the transmission-timing determination unit 735 makes reference to the byte lengths stored into the assigned byte-length table 733' (FIGS. 18A to 18E: 902 (whose details will be described later)). Then, based on the byte lengths, the unit 735 determines the time slots which allow the data to be transmitted to the respective ONUs 300 within the respective grant periods, thereby generating the values of the transmission timing table 734' (FIG. 16: 806' (whose detailed operation example will be described later)). At this time, within the grant periods using the 2.4-Gbit/s transfer rate, the byte lengths are so determined as to become values which are obtained by dividing, by 2, the assigned byte numbers in the assigned byte-length table 733'. Also, within the grant periods using the 10-Gbit/s transfer rate, the byte lengths are so determined as to become values which are obtained by dividing, by 8, the assigned byte numbers in the assigned byte-length table 733'.

FIG. 17 is also an operation flow diagram for illustrating another operation example of the OLT control unit. More specifically, FIG. 17 illustrates an operation example executed at the processing step 806' in FIG. 16, and determining the data transmission timings to the respective ONUs 300.

(E1) First, the rows of the assigned byte-length table 733' are sorted in an ascending order of the byte lengths (1301). Then, the byte length of the first ONU-ID is read from the assigned byte-length table 733' (1302).

(E2) The calculation is started from the row of the transmission timing table 734' in the first grant period (1303). Moreover, it is judged whether or not the transfer rate is equal to 2.4 Gbit/s in this grant period (1304). In the case of Yes, the byte length is divided by 2 in the subsequent calculation (1305). Meanwhile, in the case of No, the transfer rate is equal to 10 Gbit/s, and accordingly the byte length is divided by 8 in the subsequent calculation. In this way, the byte length is converted into a byte value which becomes the same time width as 1.2 Gbit/s, and the calculation is continued (1306). Incidentally, at the time of the division, in both cases, the fraction to the right of the decimal point is rounded up. Subsequently, 0 is substituted into the Start, then the Start value is written into the row of the calculation-target ONU-ID (1307).

(E3) It is judged whether or not an inequality of ((Start−1+byte length)≦155253 holds (1308). In the case of Yes, ((Start−1+byte length) is substituted into the End, then the End value is written into the row of the calculation-target ONU-ID, and the calculation-target ONU-ID is incremented by +1. Moreover, (End+1) is substituted into the Start, then the Start value is written into the row of the new calculation-target ONU-ID (1309).

(E4) Meanwhile, if the judgment (1308) is No, 155253 is substituted into the End, then the End value is written into the row of the calculation-target ONU-ID, and ((Start−1+byte length−155253) is substituted into the byte length (1310). Furthermore, the calculation proceeds to the table calculation in the next grant period by feed-backing to the processing 1304.

(E5) After the above-described processing has been repeated in the feed-backing manner, it is judged whether or not the calculations for all of the ONU-IDs have been completed (1311). In the case of Yes, for the calculation in the next DBA period, the value set into the first ONU-ID is memorized in a manner of being shifted by 1, then terminating this processing. Meanwhile, if the judgment (1311) is No, the calculation returns back to the processing 1308.

FIGS. 18A to 18E are the memory configuration diagrams for illustrating configuration examples of the assigned byte-length table 733' generated by the controls in accordance with the operation flow diagrams illustrated in FIG. 16 and FIG. 17. Also, FIGS. 19A to 19E are similarly memory configuration diagrams for illustrating configuration examples of the transmission timing table 734'.

FIGS. 18A to 18E and FIGS. 19A to 19E illustrate the examples where the assigned byte length to each ONU 300 is assigned thereto in such a manner that the assigned byte length is changed in the five ways of A to E on the basis of the queue length from each ONU 300. Concretely, FIGS. 18A to 18E and FIGS. 19A to 19E illustrate, as the examples, the situation where the queue length of each downstream packet buffer 725 corresponding to each ONU 300 is gradually increasing in correspondence with the change from A to E, and where the byte number to be transmitted to each ONU 300 and the total of the assigned byte numbers in the bandwidth-assigned period have increased accordingly.

In the above-described operation example, the explanation has been given concerning the example where the single bandwidth control period is constituted with the four frame periods, and where the transfer rate is switched for each frame period. Alternatively, the single bandwidth control period is constituted with a larger number of frame periods, and the transfer rate is switched in a finer manner. This configuration makes it possible to select a combination of the transfer rates which is the closest to the total of the byte numbers assigned to all of the ONUs, and to minimize the entire power consumption by reducing the transfer rates down to the lowest possible degree.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A passive optical network system, comprising:
   a master station;
   a plurality of slave stations; and
   an optical fiber network including an optical splitter and a plurality of optical fibers;
   wherein:
   said master station and said plurality of slave stations are connected to each other via said optical fiber network,
   said master station performing a multicast transmission of a frame signal to said plurality of slave stations via said optical fiber network, said frame signal being formed by time-division multiplexing signals which are addressed to said plurality of slave stations and received from a higher-order network,
   each of said plurality of slave stations receiving said frame signal and processing said signal which is addressed to said slave station of its own,
   said master station, including:
   an optical transmission interface for transmitting said signals to said plurality of slave stations at a first transfer rate or a second transfer rate which is higher than said first transfer rate;
   packet buffers for accumulating said signals in correspondence with each of said plurality of slave stations which are destination addresses of said signals, said signals being received from said higher-order network; and
   a control unit for
   determining transmission timings and transfer rates of said signals on the basis of an amount of said signals accumulated in said packet buffers, said signals being to be transmitted to each of said plurality of slave stations, transmitting said signals to each of said plurality of slave stations from said optical transmission interface on the basis of said transmission timings and transfer rates determined, and notifying each of said plurality of slave stations about said determined transmission timings and transfer rates;

each of said plurality of slave stations, including:

an optical reception interface for receiving said signals of said first transfer rate or said second transfer rate; and a control unit for controlling said optical reception interface on the basis of said transmission timings and transfer rates about which each of said plurality of slave stations is notified.

2. The passive optical network system according to claim 1, wherein said control unit of said master station:

determines amounts of said signals on the basis of said amount of said signals accumulated in said packet buffers, said signals being to be transmitted to each of said plurality of slave stations, and after that, determines said transfer rate of said signal to an arbitrary slave station of said plurality of slave stations as being said first transfer rate if said determined amounts of said signals are found to be lower than a maximum transfer amount which is transferable at said first transfer rate, and determines said transfer rate of said signal to said arbitrary slave station of said plurality of slave stations as being said second transfer rate if said determined amounts of said signals are found to be higher than said maximum transfer amount which is transferable at said first transfer rate.

3. The passive optical network system according to claim 1, wherein said control unit of said master station, further includes:

a bandwidth control unit for determining said amounts of said signals for each constant period and on the basis of said amount of said signals accumulated in said packet buffers, said signals being to be transmitted to each of said plurality of slave stations; and a transmission-timing control unit for determining said transmission timings and said transfer rates of said signals-transmitting master station on the basis of said determined amounts of said signals.

4. The passive optical network system according to claim 1, wherein:

said information on said transfer rates determined by said master station is inserted into a control signal area of said frame signal together with said information on said transmission timings determined by said master station, said frame signal being to be transmitted from said master station to said plurality of slave stations, and each of said plurality of slave stations being then notified about said information on said transfer rates at said first transfer rate.

5. The passive optical network system according to claim 1, wherein:

at said determination time of said transmission timings when said signals addressed to said plurality of slave stations are time-division multiplexed, said control unit of said master station also inserts a dummy signal after the last signal of said time-division multiplexed signals addressed to said plurality of slave stations, said dummy signal being formed of a plurality of bytes.

6. The passive optical network system according to claim 5, wherein:

at said determination time of said transmission timings when said signals addressed to said plurality of slave stations are time-division multiplexed, if said transfer rate of said signal addressed to said slave station changes, said signal being to be time-division multiplexed next to the signal addressed to an arbitrary slave station, said control unit of said master station inserts said dummy signal before said next signal addressed to said slave station, said dummy signal being formed of said plurality of bytes.

7. The passive optical network system according to claim 6, wherein at said determination time of said transmission timings when said signals addressed to said plurality of slave stations are time-division multiplexed, said control unit of said master station inserts said dummy signal between said signals addressed to said respective slave stations, said dummy signal being formed of said plurality of bytes.

8. A method of operating a passive optical network system, said passive optical network system, including a master station, a plurality of slave stations, and an optical fiber network including an optical splitter and a plurality of optical fibers, Where said master station and said plurality of slave stations are connected to each other via said fiber network, and Where said master station performing a multicast transmission of a frame signal to said plurality of slave stations via said optical fiber network, said frame signal being formed by time-division multiplexing signals which are addressed to said plurality of slave stations and received from a higher-order network, and each of said plurality of slave stations receiving said frame signal and processing said signal which is addressed to itself, said method of operating said passive optical network system, comprising the step of:

at said master station:

determining transmission timings of said signals and either a first transfer rate or a second transfer rate of said signals for each constant period and on the basis of amounts of said signals, said second transfer rate being higher than said first transfer rate, said signals being to be transmitted from said master station to each of said plurality of slave stations; and carrying out, to each of said plurality of slave stations, said signal transmission on the basis of said determined transmission timings and transfer rate, and notification of said determined transmission timings and transfer rate; and at each of said plurality of slave stations:

receiving said signals of said first transfer rate or said second transfer rate on the basis of said transmission timings and transfer rate about which each of said plurality of slave stations is notified from said master station.

9. The method according to claim 8, wherein said transfer rate is determined such that said transfer rate of said signal to an arbitrary slave station of said plurality of slave stations is determined as being said first transfer rate if said amounts of said signals to be transmitted are found to be lower than a maximum transfer amount which is transferable at said first transfer rate, and said transfer rate of said signal to said arbitrary slave station of said plurality of slave stations is determined as being said second transfer rate if said amounts of said signals to be transmitted are found to be higher than said maximum transfer amount which is transferable at said first transfer rate.

* * * * *